United States Patent
Lu

(10) Patent No.: US 11,438,420 B2
(45) Date of Patent: Sep. 6, 2022

(54) METHOD AND DEVICE FOR ESTABLISHING MULTI-DOMAIN MULTI-LAYER CONNECTIVITY SERVICE

(71) Applicant: ZTE CORPORATION, Shenzhen (CN)

(72) Inventor: Rongduo Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 221 days.

(21) Appl. No.: 16/772,857

(22) PCT Filed: Dec. 14, 2018

(86) PCT No.: PCT/CN2018/121243
§ 371 (c)(1),
(2) Date: Jun. 15, 2020

(87) PCT Pub. No.: WO2019/114827
PCT Pub. Date: Jun. 20, 2019

(65) Prior Publication Data
US 2021/0176321 A1 Jun. 10, 2021

(30) Foreign Application Priority Data
Dec. 14, 2017 (CN) .......................... 201711341587.2

(51) Int. Cl.
*H04L 67/141* (2022.01)
*H04L 67/146* (2022.01)
(Continued)

(52) U.S. Cl.
CPC ............ *H04L 67/141* (2013.01); *H04L 12/46* (2013.01); *H04L 45/04* (2013.01); *H04L 67/146* (2013.01)

(58) Field of Classification Search
CPC ....... H04L 67/141; H04L 12/46; H04L 45/04; H04L 67/146; H04L 41/0806; H04L 41/0896; H04L 41/044; H04L 67/32
See application file for complete search history.

(56) References Cited

U.S. PATENT DOCUMENTS 9,838,268 B1   12/2017  Mattson
2017/0104847 A1*  4/2017  Zhang ................. H04L 67/1004
(Continued)

FOREIGN PATENT DOCUMENTS

CN           1917517 A       2/2007
CN         101459610 A       6/2009
(Continued)

OTHER PUBLICATIONS

European Search Report, dated Jul. 14, 2021. pp. 1-8.
(Continued)

*Primary Examiner* — Jung H Park
(74) *Attorney, Agent, or Firm* — George McGuire

(57) ABSTRACT

Disclosed are a method and apparatus for establishing multi-domain multi-layer connectivity service. The method includes: receiving a multi-domain multi-layer connectivity service establishment request carrying an identifier of a first service interface point, first configuration information of two or more network layer protocols of the first service interface point, an identifier of a second service interface point, and second configuration information of two or more network layer protocols of the second service interface point; and establishing multi-domain multi-layer connectivity service according to the multi-domain multi-layer connectivity service establishment request.

16 Claims, 13 Drawing Sheets

(51) Int. Cl.
*H04L 12/46* (2006.01)
*H04L 45/02* (2022.01)

(56) References Cited

U.S. PATENT DOCUMENTS

| | | | | |
|---|---|---|---|---|
| 2017/0163443 | A1* | 6/2017 | Chen | H04L 12/4633 |
| 2017/0214467 | A1* | 7/2017 | Djukic | H04L 45/02 |
| 2017/0244606 | A1 | 8/2017 | Htay | |
| 2018/0278520 | A1* | 9/2018 | Fiaschi | H04L 45/64 |

FOREIGN PATENT DOCUMENTS

| | | |
|---|---|---|
| CN | 104365072 A | 2/2015 |
| CN | 104660448 A | 5/2015 |
| CN | 105744386 A | 7/2016 |
| CN | 106302153 A | 1/2017 |
| CN | 107078935 A | 8/2017 |
| CN | 107078935 B | 2/2020 |
| EP | 1755286 A1 | 2/2007 |
| WO | 03096206 A1 | 11/2003 |
| WO | WO-2017063694 A1 * | 4/2017 ............ H04L 45/04 |

OTHER PUBLICATIONS (Cai, Yinxiang, et al.) "(Research of Key Technology in Multi-Layer and Multi-Domain Optical Network Management System)", vol. 2, No. 9, Sep. 20, 2012. Entire Document.
Translated—International Search Report and Written Opinion Form PCT/ISA/210 and PCT/ISA237, International Application No. PCT/CN2018/121243 pp. 1-6, International Filing Date Dec. 14, 2018, dated Feb. 27, 2019.
Translated CN OA.
Translated CN Search Report.
"Research on Several Key Technologies of pce-based multi-layer, multi region intelligent optical networks", dated May 19, 2011, pp. 1-111.

* cited by examiner

METHOD AND DEVICE FOR ESTABLISHING MULTI-DOMAIN MULTI-LAYER CONNECTIVITY SERVICE This application is a national stage application filed under 35 U.S.C. 371 based on International Patent Application No. PCT/CN2018/121243, filed on Dec. 14, 2018, which claims priority to Chinese patent application No. 201711341587.2 filed with the CNIPA on Dec. 14, 2017, disclosures of which are incorporated herein by reference in their entireties.

TECHNICAL FIELD

The present disclosure relates to the field of transmission network communication and in particular, to a method and apparatus for establishing multi-domain multi-layer connectivity service.

BACKGROUND

Software defined network (SDN) is a new network architecture. The main feature of the SDN is the separation of a control plane and a data forwarding plane, thus achieving centralized control and programmable network operation. The SDN achieves flexible control of network flows and flexible deployment of network service, providing a good platform for innovation of core networks and applications.

In the current SDN technology, multi-domain multi-layer connectivity service is usually achieved through layer-by-layer connectivity service establishment (generally layer-by-layer establishment from a lower layer to an upper layer), which has the problems of low service opening efficiency and high service management cost.

SUMMARY

The present application provides a method and apparatus for establishing multi-domain multi-layer connectivity service, which can achieve the establishment of one-time multi-layer connectivity service, thereby improving the service opening efficiency and reducing the service management cost.

A method for establishing multi-domain multi-layer connectivity service is provided in the present application and includes steps described below.

A multi-domain multi-layer connectivity service establishment request is received; where the multi-domain multi-layer connectivity service establishment request is used for requesting establishment of multi-domain multi-layer connectivity service between a first service interface point of a first control domain and a second service interface point of a second control domain, and the multi-domain multi-layer connectivity service establishment request carries an identifier of the first service interface point, first configuration information of two or more network layer protocols of the first service interface point, an identifier of the second service interface point, and second configuration information of two or more network layer protocols of the second service interface point.

The multi-domain multi-layer connectivity service is established according to the multi-domain multi-layer connectivity service establishment request.

In an embodiment, first configuration information and second configuration information of a same network layer are the same.

In an embodiment, the multi-domain multi-layer connectivity service establishment request includes a first connectivity service end point corresponding to the first service interface point and a second connectivity service end point corresponding to the second service interface point.

The identifier of the first service interface point and the first configuration information of the two or more network layer protocols of the first service interface point are carried in the first connectivity service end point.

The identifier of the second service interface point and the second configuration information of the two or more network layer protocols of the second service interface point are carried in the second connectivity service end point.

In an embodiment, the step of establishing the multi-domain multi-layer connectivity service according to the multi-domain multi-layer connectivity service establishment request includes a step described below.

The multi-domain multi-layer connectivity service establishment request is split into two or more single-domain multi-layer connectivity service establishment requests, and the single-domain multi-layer connectivity service establishment requests are sent to respective single-domain controllers, so that the single-domain controllers achieve establishment of single-domain multi-layer connectivity service, thereby achieving the establishment of the multi-domain multi-layer connectivity service.

The single-domain multi-layer connectivity service establishment request is used for requesting the establishment of the single-domain multi-layer connectivity service in a respective control domain, and the single-domain multi-layer connectivity service establishment request carries an identifier of a third service interface point of the single-domain multi-layer connectivity service, and third configuration information of two or more network layer protocols of the third service interface point or third configuration information of a network layer protocol of a network layer where an inter-domain link of the third service interface point is located.

In an embodiment, for a same network layer, first configuration information, second configuration information, and third configuration information are the same.

In an embodiment, the single-domain multi-layer connectivity service establishment request includes a third connectivity service end point corresponding to the third service interface point.

The third connectivity service end point carries the identifier of the third service interface point, and the third configuration information of the two or more network layer protocols of the third service interface point or the third configuration information of the network layer protocol of the network layer where the inter-domain link of the third service interface point is located.

In an embodiment, the step of establishing the multi-domain multi-layer connectivity service according to the multi-domain multi-layer connectivity service establishment request includes steps described below.

A multi-domain path is calculated according to the multi-domain multi-layer connectivity service establishment request.

The multi-domain multi-layer connectivity service is split into two or more pieces of single-domain multi-layer connectivity service according to the multi-domain path.

For each piece of single-domain multi-layer connectivity service, the single-domain multi-layer connectivity service is established according to the first configuration information or the second configuration information.

A method for establishing multi-domain multi-layer connectivity service is provided in the present application and includes steps described below.

A single-domain multi-layer connectivity service establishment request is received, where the single-domain multi-layer connectivity service establishment request is used for requesting establishment of single-domain multi-layer connectivity service in a corresponding control domain, and the single-domain multi-layer connectivity service establishment request carries an identifier of a third service interface point of the single-domain multi-layer connectivity service, and third configuration information of two or more network layer protocols of the third service interface point or third configuration information of a network layer protocol of a network layer where an inter-domain link of the third service interface point is located.

The single-domain multi-layer connectivity service is established according to the single-domain multi-layer connectivity service establishment request.

In an embodiment, third configuration information of a same network layer is the same.

In an embodiment, the single-domain multi-layer connectivity service establishment request includes a third connectivity service end point corresponding to the third service interface point.

The third connectivity service end point carries the identifier of the third service interface point, and the third configuration information of the two or more network layer protocols of the third service interface point or the third configuration information of the network layer protocol of the network layer where the inter-domain link of the third service interface point is located.

An apparatus for establishing multi-domain multi-layer connectivity service is provided in the present application and includes a first receiving module and a first establishment module.

The first receiving module is configured to receive a multi-domain multi-layer connectivity service establishment request; where the multi-domain multi-layer connectivity service establishment request is used for requesting establishment of multi-domain multi-layer connectivity service between a first service interface point of a first control domain and a second service interface point of a second control domain, and the multi-domain multi-layer connectivity service establishment request carries an identifier of the first service interface point, first configuration information of two or more network layer protocols of the first service interface point, an identifier of the second service interface point, and second configuration information of two or more network layer protocols of the second service interface point; and first configuration information and second configuration information of a same network layer are the same.

The first establishment module is configured to establish the multi-domain multi-layer connectivity service according to the multi-domain multi-layer connectivity service establishment request.

In an embodiment, first configuration information and second configuration information of a same network layer are the same.

In an embodiment, the multi-domain multi-layer connectivity service establishment request includes a first connectivity service end point corresponding to the first service interface point and a second connectivity service end point corresponding to the second service interface point.

The identifier of the first service interface point and the first configuration information of the two or more network layer protocols of the first service interface point are carried in the first connectivity service end point.

The identifier of the second service interface point and the second configuration information of the two or more network layer protocols of the second service interface point are carried in the second connectivity service end point.

In an embodiment, the first establishment module is configured to: split the multi-domain multi-layer connectivity service establishment request into two or more single-domain multi-layer connectivity service establishment requests, and send the single-domain multi-layer connectivity service establishment requests to respective single-domain controllers, so that the single-domain controllers achieve establishment of single-domain multi-layer connectivity service, thereby achieving the establishment of the multi-domain multi-layer connectivity service.

The single-domain multi-layer connectivity service establishment requests is used for requesting the establishment of the single-domain multi-layer connectivity service in a respective control domain, and the single-domain multi-layer connectivity service establishment request carries an identifier of a third service interface point of the single-domain multi-layer connectivity service, and third configuration information of two or more network layer protocols of the third service interface point or third configuration information of a network layer protocol of a network layer where an inter-domain link of the third service interface point is located.

In an embodiment, for a same network layer, first configuration information, second configuration information, and third configuration information are the same.

In an embodiment, the single-domain multi-layer connectivity service establishment request includes a third connectivity service end point corresponding to the third service interface point.

The third connectivity service end point carries the identifier of the third service interface point, and the third configuration information of the two or more network layer protocols of the third service interface point or the third configuration information of the network layer protocol of the network layer where the inter-domain link is located of the third service interface point is located.

In an embodiment, the first establishment module is configured to: calculate a multi-domain path according to the multi-domain multi-layer connectivity service establishment request; and split the multi-domain multi-layer connectivity service into two or more pieces of single-domain multi-layer connectivity service according to the multi-domain path.

For each piece of single-domain multi-layer connectivity service, the single-domain multi-layer connectivity service is established according to the first configuration information or the second configuration information.

An apparatus for establishing multi-domain multi-layer connectivity service is provided in the present application and includes a second receiving module and a second establishment module.

The second receiving module is configured to receive a single-domain multi-layer connectivity service establishment request, where the single-domain multi-layer connectivity service establishment request is used for requesting establishment of single-domain multi-layer connectivity service in a corresponding control domain, the single-domain multi-layer connectivity service establishment request carries an identifier of a third service interface point of the single-domain multi-layer connectivity service and third configuration information of two or more network layer protocols of the third service interface point or third configuration information of a network layer protocol of a network layer where an inter-domain link of the third service interface point is located, and third configuration information of a same network layer is the same.

The second establishment module is configured to establish the single-domain multi-layer connectivity service according to the single-domain multi-layer connectivity service establishment request.

In an embodiment, third configuration information of a same network layer is the same.

In an embodiment, the single-domain multi-layer connectivity service establishment request includes a third connectivity service end point corresponding to the third service interface point.

The third connectivity service end point carries the identifier of the third service interface point, and the third configuration information of the two or more network layer protocols of the third service interface point or the third configuration information of the network layer protocol of the network layer where the inter-domain link is located of the third service interface point is located.

A multi-domain controller is provided in the present application and includes a first processor and a first computer-readable storage medium, where the first computer-readable storage medium is configured to store first instructions which, when executed by the processor, cause the processor to implement any above-mentioned method for establishing multi-domain multi-layer connectivity service.

A single-domain controller is provided in the present application and includes a second processor and a second computer-readable storage medium, where the second computer-readable storage medium is configured to store second instructions which, when executed by the processor, cause the processor to implement any above-mentioned method for establishing multi-domain multi-layer connectivity service.

A computer-readable storage medium is provided in the present application and configured to store computer programs which, when executed by a processor, cause the processor to implement the steps of any above-mentioned method for establishing multi-domain multi-layer connectivity service.

A computer-readable storage medium is provided in an embodiment of the present application and configured to store computer programs which, when executed by a processor, cause the processor to implement the steps of any above-mentioned method for establishing multi-domain multi-layer connectivity service.

Compared with the related art, the present application includes: receiving a multi-domain multi-layer connectivity service establishment request, where the multi-domain multi-layer connectivity service establishment request is used for requesting establishment of multi-domain multi-layer connectivity service between a first service interface point of a first control domain and a second service interface point of a second control domain, and the multi-domain multi-layer connectivity service establishment request carries an identifier of the first service interface point, first configuration information of two or more network layer protocols of the first service interface point, an identifier of the second service interface point, and second configuration information of two or more network layer protocols of the second service interface point; and establishing the multi-domain multi-layer connectivity service according to the multi-domain multi-layer connectivity service establishment request. According to the method provided by the present application, configuration information of two or more network layer protocols is carried in the multi-domain multi-layer connectivity service establishment request, so that establishment of connectivity service of the two or more network layer protocols is achieved at one time, service opening efficiency is improved, and service management cost is reduced.

Other features and advantages of the present application will be elaborated hereinafter in the description and, moreover, partially become apparent from the description, or will be understood through implementation of the present application. The object and other advantages of the present application can be achieved and obtained through structures set forth in the description, claims and drawings.

DETAILED DESCRIPTION

To illustrate the objects, technical solutions and advantages of the present application clearer, the embodiments of the present application will be described below in detail in conjunction with drawings. It is to be noted that if not in collision, the embodiments and features therein in the present application may be arbitrarily combined with each other.

The steps illustrated in the flowcharts among the drawings may be performed by a computer system such as a group of computers capable of executing instructions. Moreover, although logical sequences are illustrated in the flowcharts, the illustrated or described steps may be performed in sequences different from those described herein in some cases.

Figure 1:
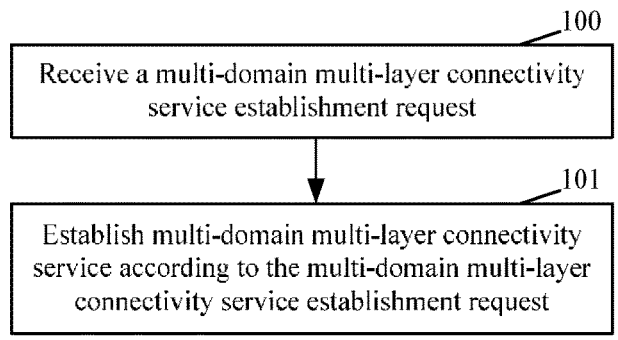
FIG. 1 is a flowchart of a method for establishing multi-domain multi-layer connectivity service according to an embodiment of the present disclosure.

Referring to FIG. 1, a method for establishing multi-domain multi-layer connectivity service is provided in the present application and includes steps described below.

In step 100, a multi-domain multi-layer connectivity service establishment request is received.

In the present application, the multi-domain multi-layer connectivity service establishment request is used for requesting establishment of multi-domain multi-layer connectivity service between a first service interface point of a first control domain and a second service interface point of a second control domain.

The control domain refers to a range of network devices or a set of network devices controlled by the controller.

A logical forwarding domain of a network layer of a network device is represented by a node in a control domain, and nodes are connected through links.

The resource information of a logical port is represented by a node edge point in the node.

The service interface point is an access point of connectivity service, and is used for characterizing abstraction of resource information of a node edge point. The service interface point includes resource pool attributes of all network layer protocols of the controlled multi-layer network. A mapping relationship exists between a service interface point and a node edge point and provides resource information for establishing, deleting and modifying the connectivity service.

For example, a resource pool attribute of the Ethernet (ETH) layer includes an Ethernet Local Area Network (ELAN) tag, and a resource pool attribute of the optical data unit (ODU) layer includes available timing.

In the present application, the multi-domain multi-layer connectivity service establishment request carries an identifier of the first service interface point, first configuration information of two or more network layer protocols of the first service interface point, an identifier of the second service interface point, and second configuration information of two or more network layer protocols of the second service interface point.

An identifier of the service interface point may be an index of the service interface point, or a name of the service interface point, or an identification (ID) of the service interface point, etc.

In an optional embodiment, the multi-domain multi-layer connectivity service establishment request includes a first connectivity service end point corresponding to the first service interface point and a second connectivity service end point corresponding to the second service interface point.

The identifier of the first service interface point and the first configuration information of the two or more network layer protocols of the first service interface point are carried in the first connectivity service end point.

The identifier of the second service interface point and the second configuration information of the two or more network layer protocols of the second service interface point are carried in the second connectivity service end point.

The connectivity service end point refers to an end point for connecting service, has a mapping relationship with a service interface point, and represents input/output roles, resource use information and the like of the connectivity service end.

For the same network layer, the first configuration information and the second configuration information are same so that the network layer protocol configuration of different control domains is consistent, achieving the intercommunication of multi-domain multi-layer connectivity service.

The configuration information includes adaptation configuration information and termination function configuration information, where the adaptation configuration information includes configuration information of a mapping method.

In an embodiment, the multi-domain multi-layer connectivity service establishment request further carries at least one of: a connectivity constraint, a protection recovery constraint, or a topology constraint.

The connectivity constraint includes names of all network layer protocols involved in the multi-domain multi-layer connectivity service.

According to the method provided by the present application, configuration information of two or more network layer protocols is carried in the multi-domain multi-layer connectivity service establishment request, so that establishment of connectivity service of the two or more network layer protocols is achieved at one time, service opening efficiency is improved, and service management cost is reduced.

In step 101, the multi-domain multi-layer connectivity service is established according to the multi-domain multi-layer connectivity service establishment request.

In an embodiment, the multi-domain multi-layer connectivity service may be established by using either a first method or a second method.

In the first method, the multi-domain multi-layer connectivity service establishment request is split into two or more single-domain multi-layer connectivity service establishment requests, and the single-domain multi-layer connectivity service establishment requests are sent to respective single-domain controllers, so that the single-domain controllers achieve establishment of single-domain multi-layer connectivity service, thereby achieving the establishment of the multi-domain multi-layer connectivity service.

In the present application, the step of splitting the multi-domain multi-layer connectivity service establishment request into two or more single-domain multi-layer connectivity service establishment requests includes: calculating a multi-domain path according to the multi-domain multi-layer connectivity service establishment request; splitting the multi-domain multi-layer connectivity service into two or more pieces of single-domain multi-layer connectivity service according to the multi-domain path; and generating the single-domain multi-layer connectivity service establishment request according to the single-domain multi-layer connectivity service.

In the present application, the single-domain multi-layer connectivity service establishment request further carries at least one of: a connectivity constraint, a protection recovery constraint, or a topology constraint.

The multi-domain path is calculated according to the identifier of the first service interface point, the identifier of the second service interface point and the above constraint condition.

In the present application, a single-domain multi-layer connectivity service establishment request is used for requesting establishment of single-domain multi-layer connectivity service in a corresponding control domain. The single-domain multi-layer connectivity service establishment request carries an identifier of a third service interface point of the single-domain multi-layer connectivity service, and third configuration information of two or more network layer protocols of the third service interface point or third configuration information of a network layer protocol of a network layer where an inter-domain link of the third service interface point is located.

In an embodiment, when the third service interface point is the first service interface point, the single-domain multi-layer connectivity service establishment request carries the identifier of the first service interface point and the first configuration information of two or more network layer protocols of the first service interface point.

When the third service interface point is the second service interface point, the single-domain multi-layer connectivity service establishment request carries the identifier of the second service interface point and the second configuration information of two or more network layer protocols of the second service interface point.

When the third service interface point is different from the first service interface point and the second service interface point, the single-domain multi-layer connectivity service establishment request carries the identifier of the third service interface point and the third configuration information of a network layer protocol of a network layer where the inter-domain link of the third service interface point is located.

In an embodiment, the single-domain multi-layer connectivity service establishment request includes a third connectivity service end point corresponding to the third service interface point.

The third connectivity service end point carries the identifier of the third service interface point, and the third configuration information of the two or more network layer protocols of the third service interface point corresponding to the third service interface point or the third configuration information of the network layer protocol of the network layer where the inter-domain link is located of the third service interface point is located.

In an embodiment, the third configuration information of the same network layer is the same and is the same as the first configuration information and the second configuration information. The network layer protocol configuration of different control domains is thus consistent, achieving the intercommunication of multi-domain multi-layer connectivity service.

In the second method, a multi-domain path is calculated according to the multi-domain multi-layer connectivity service establishment request; the multi-domain multi-layer connectivity service is split into two or more pieces of single-domain multi-layer connectivity service according to the multi-domain path; and for each single-domain multi-layer connectivity service, the single-domain multi-layer connectivity service is established according to the first configuration information or the second configuration information.

In the present application, the multi-domain path is calculated according to the identifier of the first service interface point, the identifier of the second interface point and the above constraint condition.

In the present application, the step of establishing the single-domain multi-layer connectivity service according to the first configuration information or the second configuration information includes: calculating a single-domain path according to the identifier of the service interface point of the single-domain multi-layer connectivity service; establishing connection in all nodes according to the single-domain path; and configuring the network device corresponding to the service interface point according to the established connection and the configuration information of the network layer protocol of the service interface point of the single-domain multi-layer connectivity service, so as to achieve the establishment of the single-domain multi-layer connectivity service.

The single-domain path is calculated according to the identifier of the service interface point and the above constraint condition.

In an optional embodiment, the method further includes a step described below before the above steps.

The network topology of the controlled multi-layer network is abstracted and queried to obtain service interface points.

Figure 2:
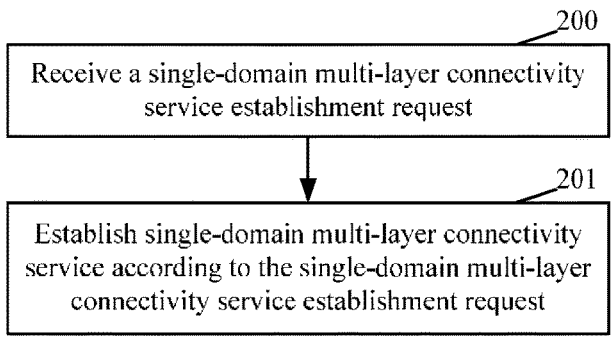
FIG. 2 is a flowchart of another method for establishing multi-domain multi-layer connectivity service according to an embodiment of the present disclosure.

Referring to FIG. 2, a method for establishing multi-domain multi-layer connectivity service is provided in the present application and includes steps described below.

In step 200, a single-domain multi-layer connectivity service establishment request is received.

In the present application, the single-domain multi-layer connectivity service establishment request is used for requesting establishment of single-domain multi-layer connectivity service in a corresponding control domain. The single-domain multi-layer connectivity service establishment request carries an identifier of a third service interface point of single-domain multi-layer connectivity service, and third configuration information of two or more network layer protocols of the third service interface point or third configuration information of a network layer protocol of a network layer where an inter-domain link of the third service interface point is located.

In an embodiment, when the third service interface point is the first service interface point, the single-domain multi-layer connectivity service establishment request carries an identifier of the first service interface point and first configuration information of two or more network layer protocols of the first service interface point.

When the third service interface point is a second service interface point, the single-domain multi-layer connectivity service establishment request carries an identifier of the second service interface point and second configuration information of two or more network layer protocols of the second service interface point.

When the third service interface point is different from the first service interface point and the second service interface point, the single-domain multi-layer connectivity service establishment request carries the identifier of the third service interface point and the third configuration information of a network layer protocol of a network layer where the inter-domain link of the third service interface point is located.

In an embodiment, the single-domain multi-layer connectivity service establishment request includes a third connectivity service end point corresponding to the third service interface point.

The third connectivity service end point carries the identifier of the third service interface point, and the third configuration information of the two or more network layer protocols of the third service interface point or the third configuration information of the network layer protocol of the network layer where the inter-domain link is located of the third service interface point is located.

The third configuration information of the same network layer is the same and is the same as the first configuration information and the second configuration information.

In an embodiment, the single-domain multi-layer connectivity service establishment request further carries at least one of: a connectivity constraint, a protection recovery constraint, or a topology constraint.

In step 201, the single-domain multi-layer connectivity service is established according to the single-domain multi-layer connectivity service establishment request.

In an embodiment, a single-domain path is calculated according to the single-domain multi-layer connectivity service establishment request; connection in all nodes is established according to the single-domain path; and the network device corresponding to the third service interface point is configured according to the established connection and the third configuration information in the single-domain multi-layer connectivity service establishment request, so as to achieve the establishment of the single-domain multi-layer connectivity service.

The single-domain path is calculated according to the identifier of the third service interface point and the above constraint condition.

Specific implementation of the method for establishing multi-domain multi-layer connectivity service of the present application is described below by several specific embodiments.

Embodiment One

The embodiment illustrates a method for establishing multi-domain multi-layer connectivity service by taking establishment of connectivity service of a two-layer network and two control domains as an example.

Figure 3:
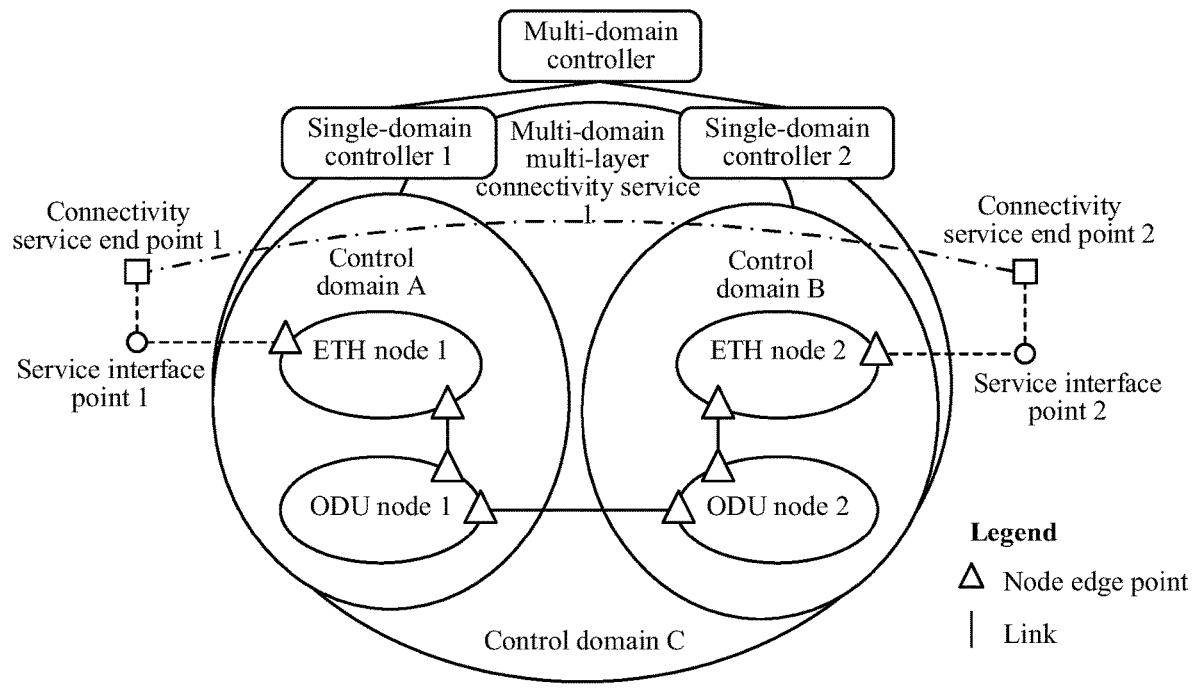
FIG. 3 is a schematic diagram illustrating a structure of control domains of a multi-domain controller according to Embodiment one of the present disclosure.

Referring to FIG. 3, a multi-domain controller controls two single-domain controllers, i.e., single-domain controller 1 and single-domain controller 2, a control domain of the multi-domain controller is control domain C, a control domain of the single-domain controller 1 is control domain A, and a control domain of the single-domain controller 2 is control domain B.

Figure 4:
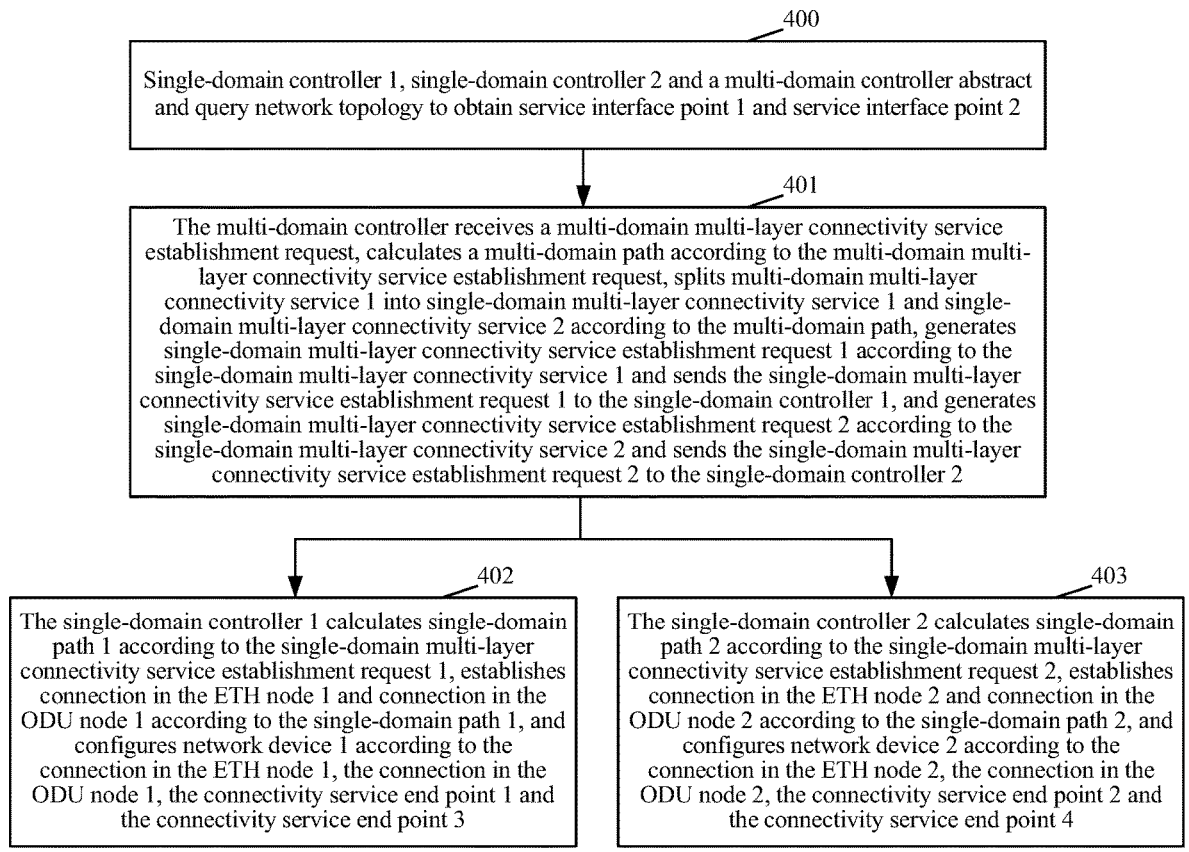
FIG. 4 is a flowchart of a method for establishing multi-domain multi-layer connectivity service according to Embodiment one of the present disclosure.

Referring to FIG. 4, a method for establishing multi-domain multi-layer connectivity service provided in the embodiment includes steps described below.

In step 400, the single-domain controller 1, the single-domain controller 2 and the multi-domain controller abstract and query the network topology to obtain service interface point 1 and service interface point 2.

In the embodiment, the service interface point 1 includes a resource pool attribute of a network layer protocol corresponding to ETH node 1 in the control domain A and a resource pool attribute of a network layer protocol corresponding to ODU node 1 in the control domain A.

The service interface point 2 includes a resource pool attribute of a network layer protocol corresponding to ETH node 2 in the control domain B and a resource pool attribute of a network layer protocol corresponding to ODU node 2 in the control domain B.

In step 401, the multi-domain controller receives a multi-domain multi-layer connectivity service establishment request, calculates a multi-domain path according to the multi-domain multi-layer connectivity service establishment request, splits multi-domain multi-layer connectivity service 1 into single-domain multi-layer connectivity service 1 and single-domain multi-layer connectivity service 2 according to the multi-domain path, generates single-domain multi-layer connectivity service establishment request 1 according to the single-domain multi-layer connectivity service 1 and sends the single-domain multi-layer connectivity service establishment request 1 to the single-domain controller 1, and generates single-domain multi-layer connectivity service establishment request 2 according to the single-domain multi-layer connectivity service 2 and sends the single-domain multi-layer connectivity service establishment request 2 to the single-domain controller 2.

In the embodiment, as shown in FIG. 3, a multi-domain multi-layer connectivity service establishment request is used for requesting establishment of multi-domain multi-layer connectivity service 1 between service interface point 1 and service interface point 2, where the multi-domain multi-layer connectivity service 1 is connectivity service of an automatic service creation layer (including an ODU layer) with an ETH layer as a top layer.

The multi-domain multi-layer connectivity service establishment request includes connectivity service end point 1 and connectivity service end point 2, a one-to-one mapping relationship exists between the connectivity service end point 1 and the service interface point 1, and a one-to-one mapping relationship exists between the connectivity service end point 2 and the service interface point 2.

The connectivity service end point 1 carries: an index of the service interface point 1, configuration information 1 of an ETH network layer protocol, and configuration information 1 of an ODU network layer protocol.

The connectivity service end point 2 carries: an index of the service interface point 2, configuration information 2 of the ETH network layer protocol, and configuration information 2 of the ODU network layer protocol.

Moreover, the configuration information 1 of the ETH network layer protocol is the same as the configuration information 2 of the ETH network layer protocol, and the configuration information 1 of the ODU network layer protocol is the same as the configuration information 2 of the ODU network layer protocol.

The above configuration information includes adaptation configuration information and termination function configuration information. The adaptation configuration information includes configuration information of a mapping method, e.g., a mapping method of an ODU client signal, such as Generic Framing Procedure-Frame (GFT-F), Generic Framing Procedure-Transparent (GFP-T), and Bit-synchronous Mapping Procedure (BMP).

Figure 5:
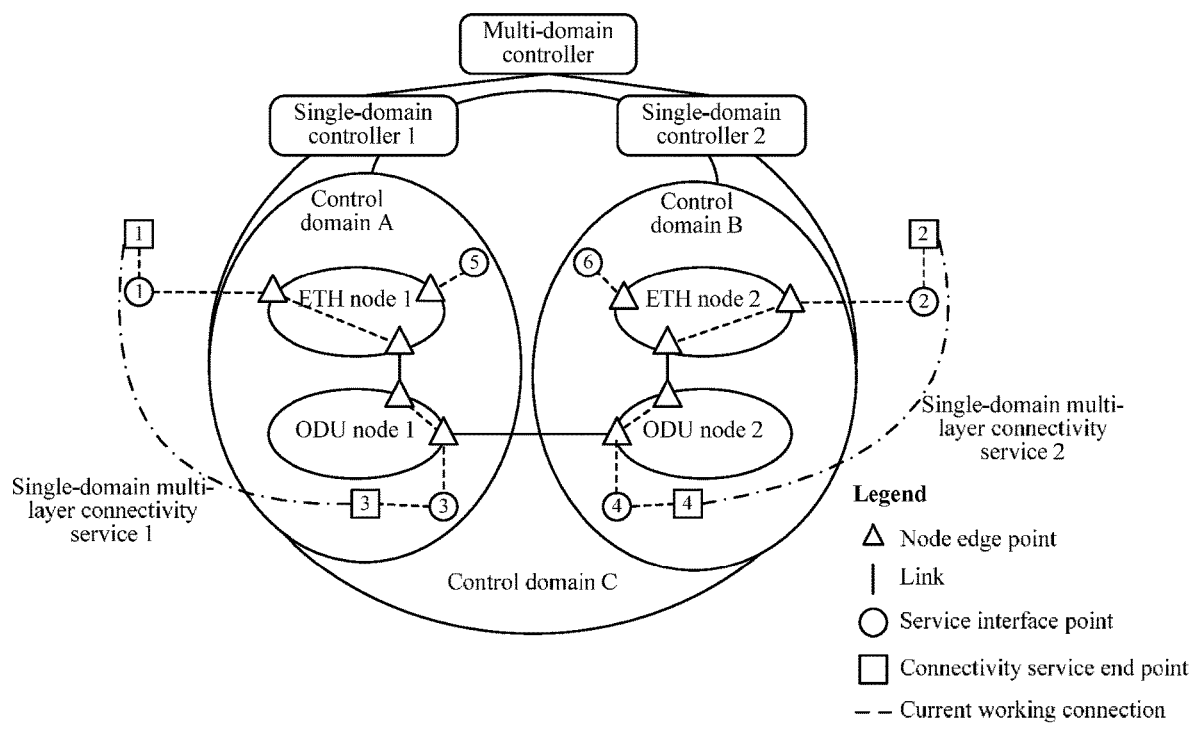
FIG. 5 is a schematic diagram illustrating establishment of single-domain multi-layer connectivity service according to Embodiment one of the present disclosure.

In the embodiment, as shown in FIG. 5, the multi-domain controller splits the multi-domain multi-layer connectivity service 1 into single-domain multi-layer connectivity service 1 and single-domain multi-layer connectivity service 2, generates single-domain multi-layer connectivity service establishment request 1 according to the single-domain multi-layer connectivity service 1 and sends the single-domain multi-layer connectivity service establishment request 1 to the single-domain controller 1 so that the single-domain controller 1 completes the establishment of the single-domain multi-layer connectivity service 1, and generates single-domain multi-layer connectivity service establishment request 2 according to the single-domain multi-layer connectivity service 2 and sends the single-domain multi-layer connectivity service establishment request 2 to the single-domain controller 2 so that the single-domain controller 2 completes the establishment of the single-domain multi-layer connectivity service 2.

In the embodiment, the single-domain multi-layer connectivity service establishment request 1 is used for requesting establishment of single-domain multi-layer connectivity service 1 in the control domain A. The single-domain multi-layer connectivity service establishment request 1 includes connectivity service end point 1 and connectivity service end point 3.

The connectivity service end point 3 carries: an index of the service interface point 3 and configuration information 3 of the ODU network layer protocol.

Moreover, the configuration information 3 of the ODU network layer protocol, the configuration information 1 of the ODU network layer protocol, and the configuration information 2 of the ODU network layer protocol are all the same.

The single-domain multi-layer connectivity service establishment request 2 is used for requesting establishment of single-domain multi-layer connectivity service 2 in the control domain B. The single-domain multi-layer connectivity service establishment request 2 includes connectivity service end point 2 and connectivity service end point 4.

The connectivity service end point 4 carries: an index of the service interface point 4 and configuration information 4 of the ODU network layer protocol.

Moreover, the configuration information 4 of the ODU network layer protocol, the configuration information 1 of the ODU network layer protocol, and the configuration information 2 of the ODU network layer protocol are all the same.

In step 402, the single-domain controller 1 calculates single-domain path 1 according to the single-domain multi-layer connectivity service establishment request 1, establishes connection in the ETH node 1 and connection in the ODU node 1 according to the single-domain path 1, and configures network device 1 according to the connection in the ETH node 1, the connection in the ODU node 1, the connectivity service end point 1 and the connectivity service end point 3.

In step 403, the single-domain controller 2 calculates single-domain path 2 according to the single-domain multi-layer connectivity service establishment request 2, establishes connection in the ETH node 2 and connection in the ODU node 2 according to the single-domain path 2, and configures network device 2 according to the connection in the ETH node 2, the connection in the ODU node 2, the connectivity service end point 2 and the connectivity service end point 4.

Embodiment Two

The embodiment illustrates a method for establishing multi-domain multi-layer connectivity service by taking establishment of connectivity service of a three-layer network and two control domains as an example.

Figure 6:
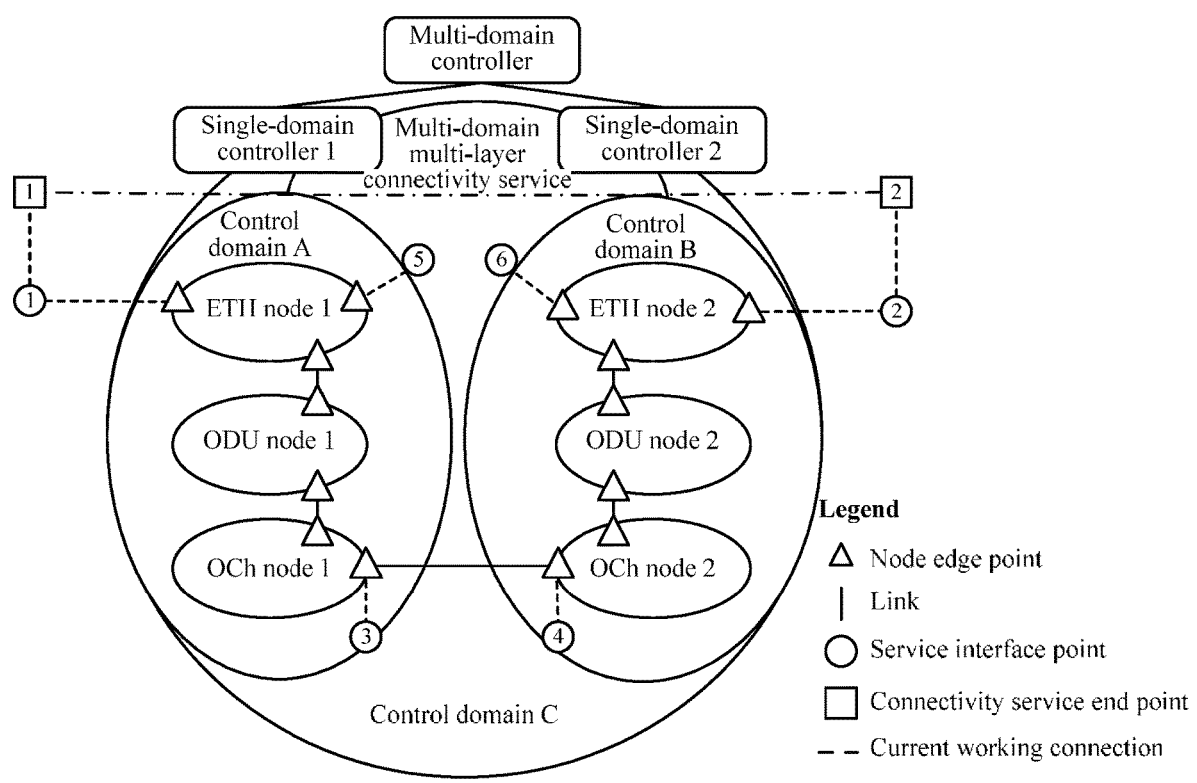
FIG. 6 is a flowchart of a method for establishing multi-domain multi-layer connectivity service according to Embodiment two of the present disclosure.

Referring to FIG. 6, a multi-domain controller controls two single-domain controllers, i.e., single-domain controller 1 and single-domain controller 6, a control domain of the multi-domain controller is control domain C, a control domain of the single-domain controller 1 is control domain A, and a control domain of the single-domain controller 2 is control domain B.

Figure 7:
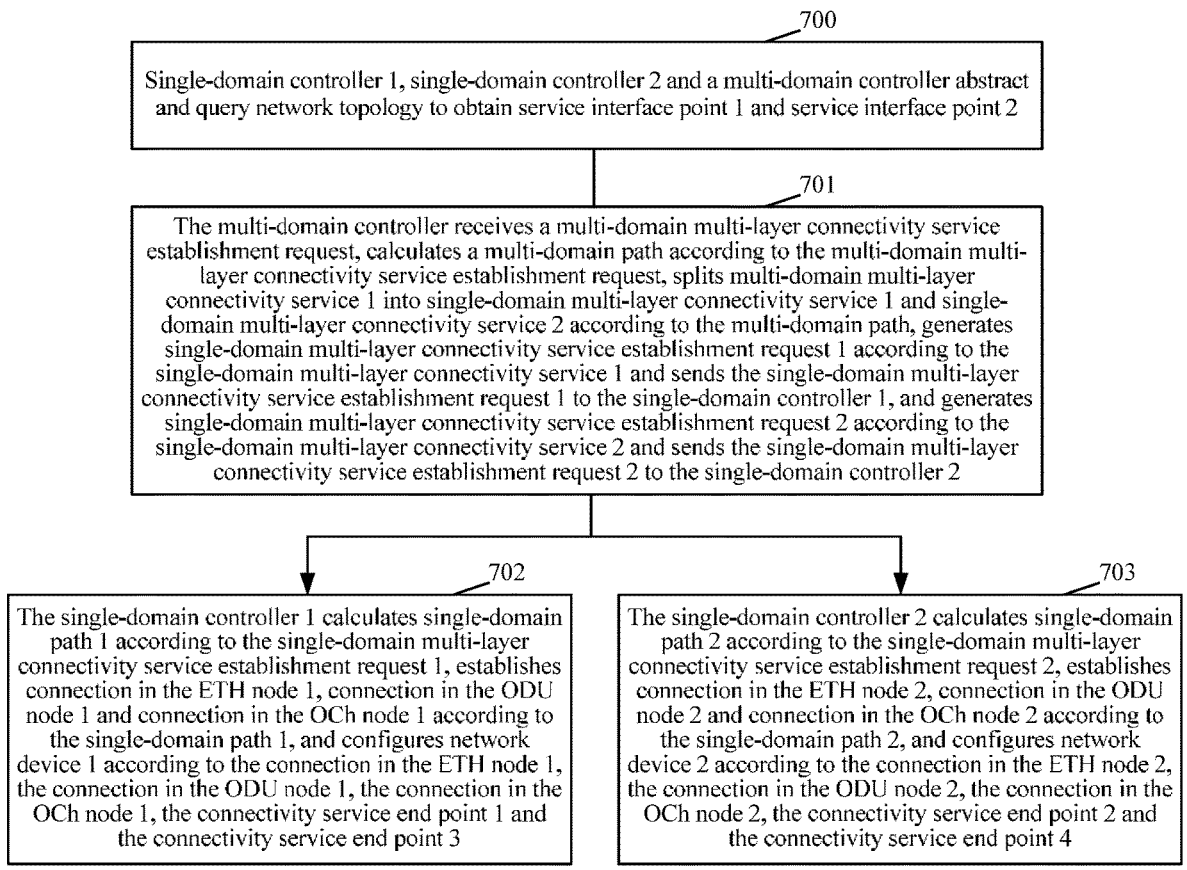
FIG. 7 is a schematic diagram illustrating establishment of multi-domain multi-layer connectivity service according to Embodiment two of the present disclosure.

Referring to FIG. 7, a method for establishing multi-domain multi-layer connectivity service provided in the embodiment includes steps described below.

In step 700, the single-domain controller 1, the single-domain controller 2 and the multi-domain controller abstract and query the network topology to obtain service interface point 1 and service interface point 2.

In the embodiment, the service interface point 1 includes a resource pool attribute of a network layer protocol corresponding to the ETH node 1 in the control domain A, a resource pool attribute of a network layer protocol corresponding to the ODU node 1 in the control domain A, and a resource pool attribute of a network layer protocol corresponding to optical channel (OCh) node 1 in the control domain A.

The service interface point 2 includes a resource pool attribute of a network layer protocol corresponding to the ETH node 2 in the control domain B, a resource pool attribute of a network layer protocol corresponding to the ODU node 2 in the control domain B, and a resource pool attribute of a network layer protocol corresponding to the OCh node 2 in the control domain B.

In step 701, the multi-domain controller receives a multi-domain multi-layer connectivity service establishment request, calculates a multi-domain path according to the multi-domain multi-layer connectivity service establishment request, splits multi-domain multi-layer connectivity service 1 into single-domain multi-layer connectivity service 1 and single-domain multi-layer connectivity service 2 according to the multi-domain path, generates single-domain multi-layer connectivity service establishment request 1 according to the single-domain multi-layer connectivity service 1 and sends the single-domain multi-layer connectivity service establishment request 1 to the single-domain controller 1, and generates single-domain multi-layer connectivity service establishment request 2 according to the single-domain multi-layer connectivity service 2 and sends the single-domain multi-layer connectivity service establishment request 2 to the single-domain controller 2.

In the embodiment, as shown in FIG. 6, a multi-domain multi-layer connectivity service establishment request is used for requesting establishment of multi-domain multi-layer connectivity service 1 between service interface point 1 and service interface point 2, where the multi-domain multi-layer connectivity service 1 is connectivity service of an automatic service creation layer (including an ODU layer and an OCh layer) with an ETH layer as a top layer.

The multi-domain multi-layer connectivity service establishment request includes connectivity service end point 1 and connectivity service end point 2, a one-to-one mapping relationship exists between the connectivity service end point 1 and the service interface point 1, and a one-to-one mapping relationship exists between the connectivity service end point 2 and the service interface point 2.

The connectivity service end point 1 carries: an index of the service interface point 1, configuration information 1 of the ETH network layer protocol, configuration information 1 of the ODU network layer protocol, and configuration information 1 of the OCh network layer protocol.

The connectivity service end point 2 carries: an index of the service interface point 2, configuration information 2 of the ETH network layer protocol, configuration information 2 of the ODU network layer protocol, and configuration information 2 of the OCh network layer protocol.

Moreover, the configuration information 1 of the ETH network layer protocol is the same as the configuration information 2 of the ETH network layer protocol, the configuration information 1 of the ODU network layer protocol is the same as the configuration information 2 of the ODU network layer protocol, and the configuration information 1 of the OCh network layer protocol is the same as the configuration information 2 of the OCh network layer protocol.

The above configuration information includes adaptation configuration information and termination function configuration information. The adaptation configuration information includes configuration information of a mapping method, e.g., a mapping method of an ODU client signal, such as GFT-F, GFP-T, and BMP.

Figure 8:
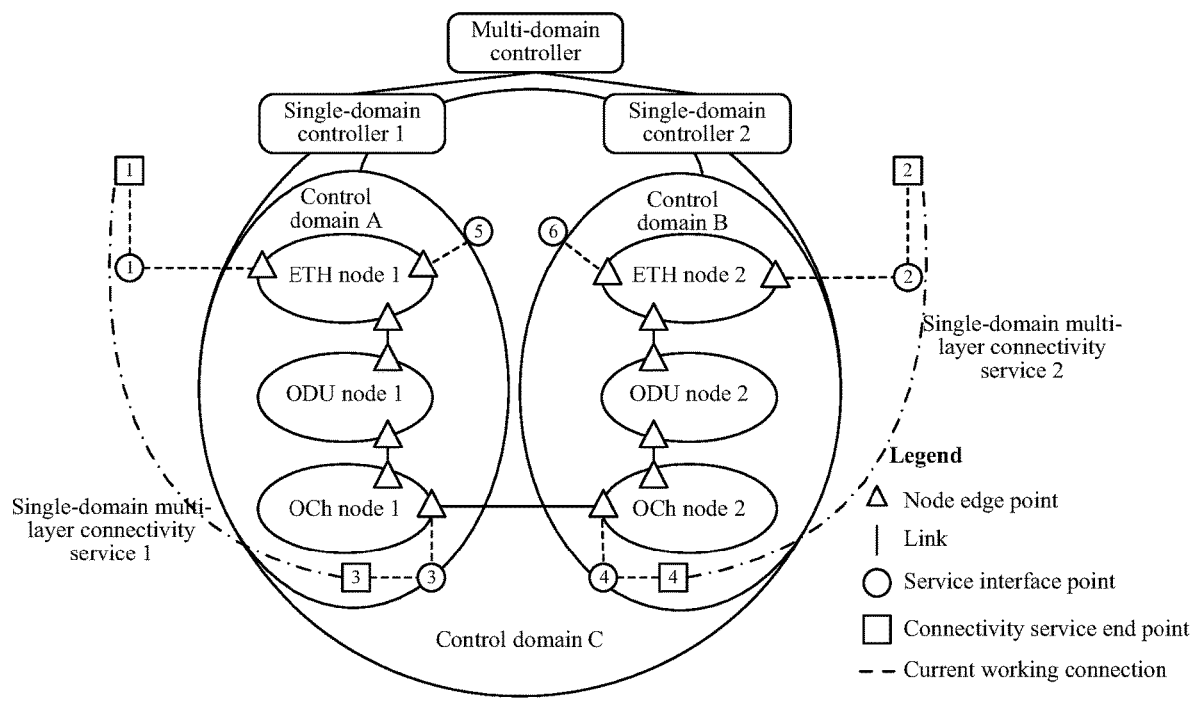
FIG. 8 is a schematic diagram illustrating establishment of single-domain multi-layer connectivity service according to Embodiment two of the present disclosure.

In the embodiment, as shown in FIG. 8, the multi-domain controller splits the multi-domain multi-layer connectivity service 1 into single-domain multi-layer connectivity service 1 and single-domain multi-layer connectivity service 2, generates single-domain multi-layer connectivity service establishment request 1 according to the single-domain multi-layer connectivity service 1 and sends the single-domain multi-layer connectivity service establishment request 1 to the single-domain controller 1 so that the single-domain controller 1 completes the establishment of the single-domain multi-layer connectivity service 1, and generates single-domain multi-layer connectivity service establishment request 2 according to the single-domain multi-layer connectivity service 2 and sends the single-domain multi-layer connectivity service establishment request 2 to the single-domain controller 2 so that the single-domain controller 2 completes the establishment of the single-domain multi-layer connectivity service 2.

In the embodiment, the single-domain multi-layer connectivity service establishment request 1 is used for requesting establishment of single-domain multi-layer connectivity service 1 in the control domain A. The single-domain multi-layer connectivity service establishment request 1 includes connectivity service end point 1 and connectivity service end point 3.

The connectivity service end point 3 carries: an index of the service interface point 3 and configuration information 3 of the OCh network layer protocol.

Moreover, the configuration information 3 of the OCh network layer protocol, the configuration information 1 of the OCh network layer protocol, and the configuration information 2 of the OCh network layer protocol are all the same.

The single-domain multi-layer connectivity service establishment request 2 is used for requesting establishment of single-domain multi-layer connectivity service 2 in the control domain B. The single-domain multi-layer connectivity service establishment request 2 includes connectivity service end point 2 and connectivity service end point 4.

The connectivity service end point 4 carries: an index of the service interface point 4 and configuration information 4 of the OCh network layer protocol.

Moreover, the configuration information 4 of the OCh network layer protocol, the configuration information 1 of the OCh network layer protocol, and the configuration information 2 of the OCh network layer protocol are all the same.

In step 702, the single-domain controller 1 calculates single-domain path 1 according to the single-domain multi-layer connectivity service establishment request 1, establishes connection in the ETH node 1, connection in the ODU node 1 and connection in the OCh node 1 according to the single-domain path 1, and configures network device 1 according to the connection in the ETH node 1, the connection in the ODU node 1, the connection in the OCh node 1, the connectivity service end point 1 and the connectivity service end point 3.

In step 703, the single-domain controller 2 calculates single-domain path 2 according to the single-domain multi-layer connectivity service establishment request 2, establishes connection in the ETH node 2, connection in the ODU node 2 and connection in the OCh node 2 according to the single-domain path 2, and configures network device 2 according to the connection in the ETH node 2, the connection in the ODU node 2, the connection in the OCh node 2, the connectivity service end point 2 and the connectivity service end point 4.

Embodiment Three

The embodiment illustrates a method for establishing multi-domain multi-layer connectivity service by taking establishment of connectivity service of a two-layer network and three control domains as an example.

Figure 9:
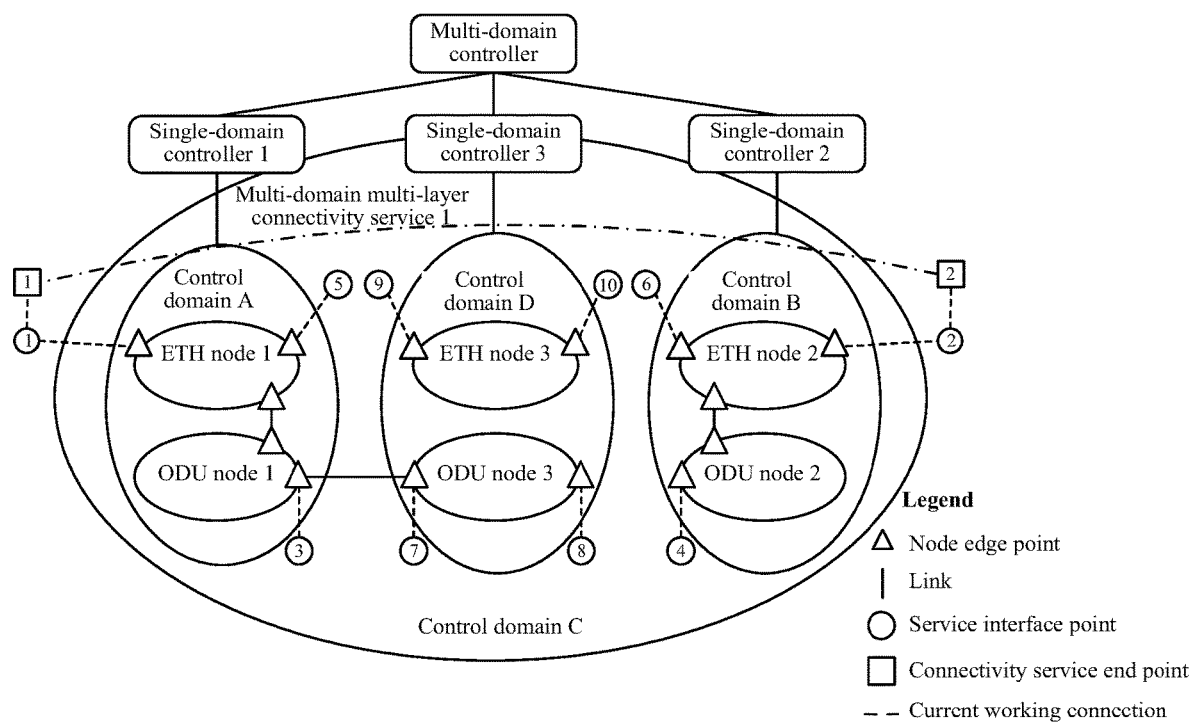
FIG. 9 is a flowchart of a method for establishing multi-domain multi-layer connectivity service according to Embodiment three of the present disclosure.

Referring to FIG. 9, a multi-domain controller controls three single-domain controllers, i.e., single-domain controller 1, single-domain controller 2 and single-domain controller 3, a control domain of the multi-domain controller is control domain C, a control domain of the single-domain controller 1 is control domain A, a control domain of the single-domain controller 2 is control domain B, and a control domain of the single-domain controller 3 is control domain D.

Figure 10:
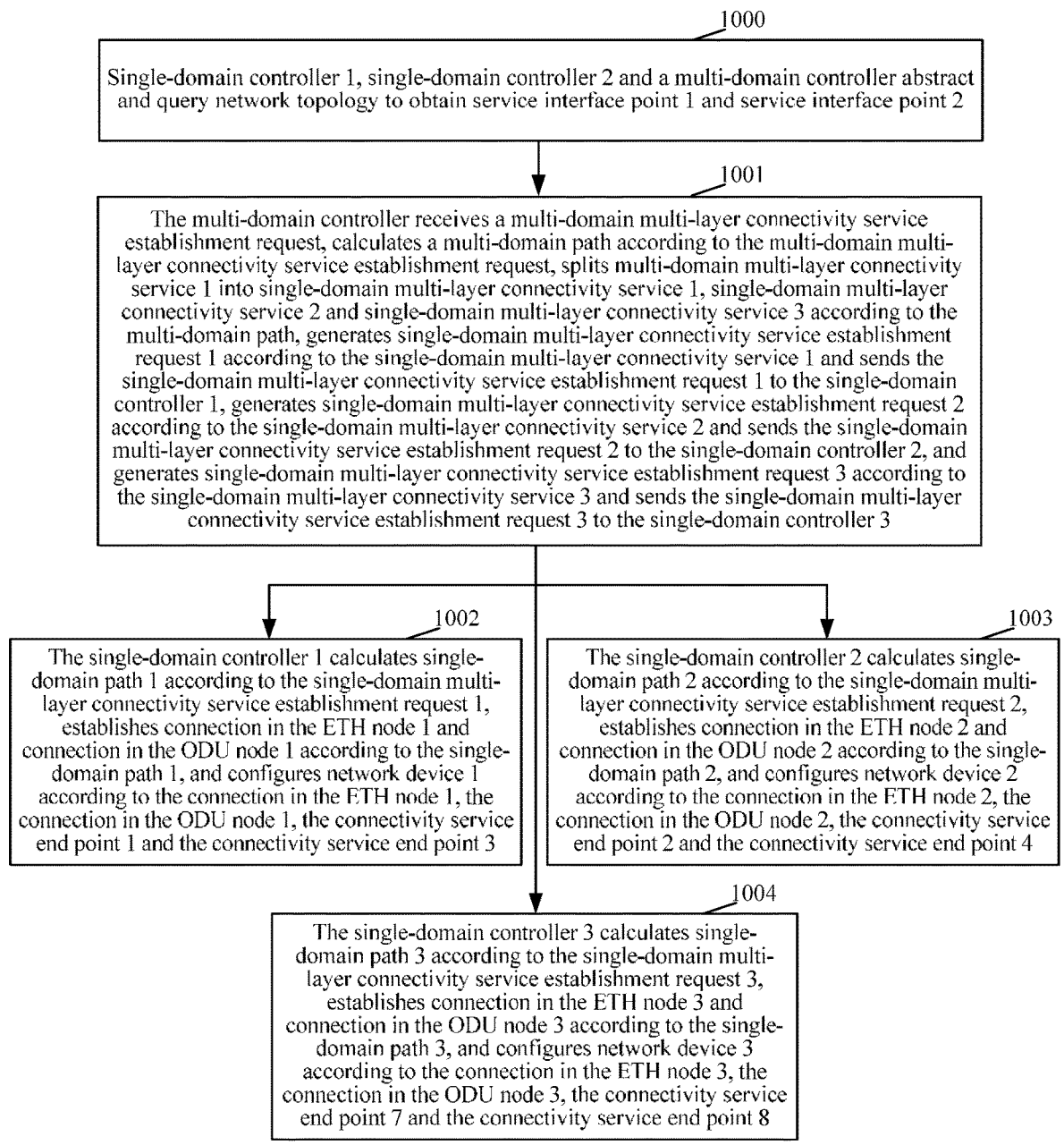
FIG. 10 is a schematic diagram illustrating establishment of multi-domain multi-layer connectivity service according to Embodiment three of the present disclosure.

Referring to FIG. 10, a method for establishing multi-domain multi-layer connectivity service provided in the embodiment includes steps described below.

In step 1000, the single-domain controller 1, the single-domain controller 2 and the multi-domain controller abstract and query the network topology to obtain service interface point 1 and service interface point 2.

In the embodiment, the service interface point 1 includes a resource pool attribute of a network layer protocol corresponding to ETH node 1 in the control domain A and a resource pool attribute of a network layer protocol corresponding to ODU node 1 in the control domain A.

The service interface point 2 includes a resource pool attribute of a network layer protocol corresponding to ETH node 2 in the control domain B and a resource pool attribute of a network layer protocol corresponding to ODU node 2 in the control domain B.

In step 1001, the multi-domain controller receives a multi-domain multi-layer connectivity service establishment request, calculates a multi-domain path according to the multi-domain multi-layer connectivity service establishment request, splits multi-domain multi-layer connectivity service 1 into single-domain multi-layer connectivity service 1, single-domain multi-layer connectivity service 2 and single-domain multi-layer connectivity service 3 according to the multi-domain path, generates single-domain multi-layer connectivity service establishment request 1 according to the single-domain multi-layer connectivity service 1 and sends the single-domain multi-layer connectivity service establishment request 1 to the single-domain controller 1, generates single-domain multi-layer connectivity service establishment request 2 according to the single-domain multi-layer connectivity service 2 and sends the single-domain multi-layer connectivity service establishment request 2 to the single-domain controller 2, and generates single-domain multi-layer connectivity service establishment request 3 according to the single-domain multi-layer connectivity service 3 and sends the single-domain multi-layer connectivity service establishment request 3 to the single-domain controller 3.

In the embodiment, as shown in FIG. 9, a multi-domain multi-layer connectivity service establishment request is used for requesting establishment of multi-domain multi-layer connectivity service 1 between service interface point 1 and service interface point 2, where the multi-domain multi-layer connectivity service 1 is connectivity service of an automatic service creation layer (including an ODU layer) with an ETH layer as a top layer.

The multi-domain multi-layer connectivity service establishment request includes connectivity service end point 1 and connectivity service end point 2, a one-to-one mapping relationship exists between the connectivity service end point 1 and the service interface point 1, and a one-to-one mapping relationship exists between the connectivity service end point 2 and the service interface point 2.

The connectivity service end point 1 carries: an index of the service interface point 1, configuration information 1 of the ETH network layer protocol, and configuration information 1 of the ODU network layer protocol.

The connectivity service end point 2 carries: an index of the service interface point 2, configuration information 2 of the ETH network layer protocol, and configuration information 2 of the ODU network layer protocol.

Moreover, the configuration information 1 of the ETH network layer protocol is the same as the configuration information 2 of the ETH network layer protocol, and the configuration information 1 of the ODU network layer protocol is the same as the configuration information 2 of the ODU network layer protocol.

The above configuration information includes adaptation configuration information and termination function configuration information. The adaptation configuration information includes configuration information of a mapping method, e.g., a mapping method of an ODU client signal, such as GFT-F, GFP-T, and BMP.

Figure 11:
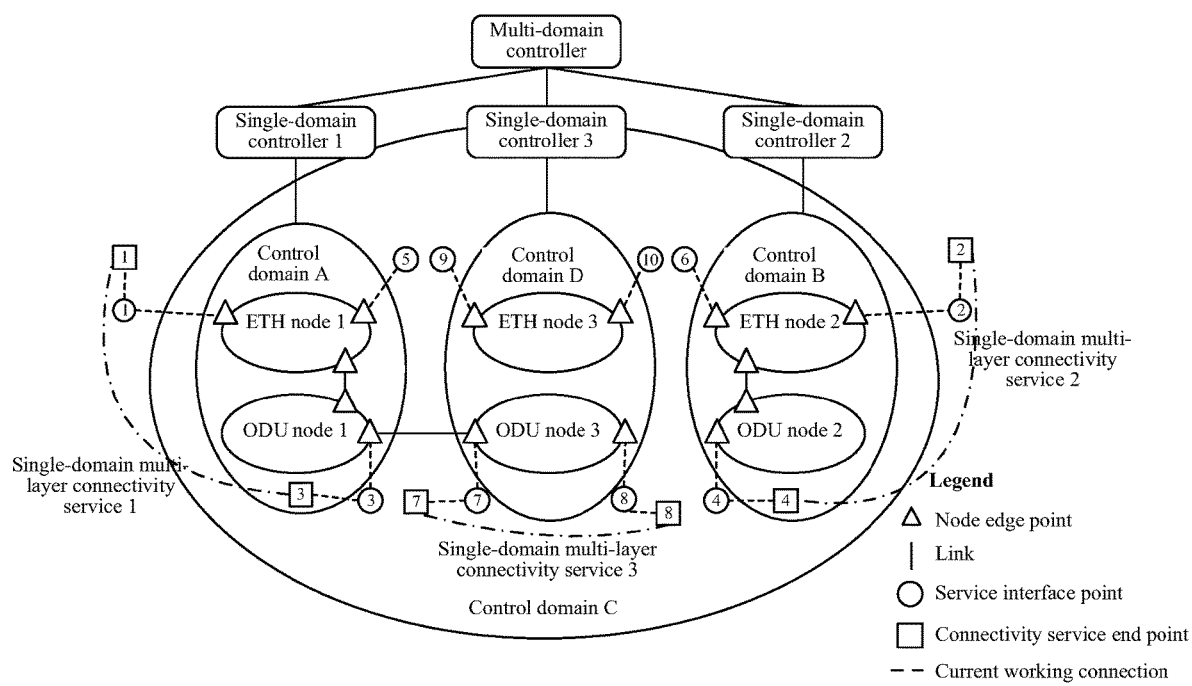
FIG. 11 is a schematic diagram illustrating establishment of single-domain multi-layer connectivity service according to Embodiment three of the present disclosure.

In the embodiment, as shown in FIG. 11, the multi-domain controller splits the multi-domain multi-layer connectivity service 1 into single-domain multi-layer connectivity service 1, single-domain multi-layer connectivity service 2 and single-domain multi-layer connectivity service 3, generates single-domain multi-layer connectivity service establishment request 1 according to the single-domain multi-layer connectivity service 1 and sends the single-domain multi-layer connectivity service establishment request 1 to the single-domain controller 1 so that the single-domain controller 1 completes the establishment of the single-domain multi-layer connectivity service 1, generates single-domain multi-layer connectivity service establishment request 2 according to the single-domain multi-layer connectivity service 2 and sends the single-domain multi-layer connectivity service establishment request 2 to the single-domain controller 2 so that the single-domain controller 2 completes the establishment of the single-domain multi-layer connectivity service 2, and generates single-domain multi-layer connectivity service establishment request 3 according to the single-domain multi-layer connectivity service 3 and sends the single-domain multi-layer connectivity service establishment request 3 to the single-domain controller 3 so that the single-domain controller 3 completes the establishment of the single-domain multi-layer connectivity service 3.

In the embodiment, the single-domain multi-layer connectivity service establishment request 1 is used for requesting establishment of single-domain multi-layer connectivity service 1 in the control domain A. The single-domain multi-layer connectivity service establishment request 1 includes connectivity service end point 1 and connectivity service end point 3.

The connectivity service end point 3 carries: an index of the service interface point 3 and configuration information 3 of the ODU network layer protocol.

Moreover, the configuration information 3 of the ODU network layer protocol, the configuration information 1 of the ODU network layer protocol, and the configuration information 2 of the ODU network layer protocol are all the same.

The single-domain multi-layer connectivity service establishment request 2 is used for requesting establishment of single-domain multi-layer connectivity service 2 in the control domain B. The single-domain multi-layer connectivity service establishment request 2 includes connectivity service end point 2 and connectivity service end point 4.

The connectivity service end point 4 carries: an index of the service interface point 4 and configuration information 4 of the ODU network layer protocol.

Moreover, the configuration information 4 of the ODU network layer protocol, the configuration information 1 of the ODU network layer protocol, and the configuration information 2 of the ODU network layer protocol are all the same.

The single-domain multi-layer connectivity service establishment request 3 is used for requesting establishment of single-domain multi-layer connectivity service 3 in the control domain D. The single-domain multi-layer connectivity service establishment request 3 includes connectivity service end point 7 and connectivity service end point 8.

The connectivity service end point 7 carries: an index of the service interface point 7 and configuration information 7 of the ODU network layer protocol.

The connectivity service end point 8 carries: an index of the service interface point 8 and configuration information 8 of the ODU network layer protocol.

The configuration information 7 of the ODU network layer protocol, the configuration information 8 of the ODU network layer protocol, the configuration information 1 of the ODU network layer protocol and the configuration information 2 of the ODU network layer protocol are all the same.

In step 1002, the single-domain controller 1 calculates single-domain path 1 according to the single-domain multi-layer connectivity service establishment request 1, establishes connection in the ETH node 1 and connection in the ODU node 1 according to the single-domain path 1, and configures network device 1 according to the connection in the ETH node 1, the connection in the ODU node 1, the connectivity service end point 1 and the connectivity service end point 3.

In step 1003, the single-domain controller 2 calculates single-domain path 2 according to the single-domain multi-layer connectivity service establishment request 2, establishes connection in the ETH node 2 and connection in the ODU node 2 according to the single-domain path 2, and configures network device 2 according to the connection in the ETH node 2, the connection in the ODU node 2, the connectivity service end point 2 and the connectivity service end point 4.

In step 1004, the single-domain controller 3 calculates single-domain path 3 according to the single-domain multi-layer connectivity service establishment request 3, establishes connection in the ETH node 3 and connection in the ODU node 3 according to the single-domain path 3, and configures network device 3 according to the connection in the ETH node 3, the connection in the ODU node 3, the connectivity service end point 7 and the connectivity service end point 8.

Embodiment Four

The embodiment illustrates a method for establishing multi-domain multi-layer connectivity service by taking the establishment of connectivity service with asymmetric numbers of network layers in two control domains as an example.

Figure 12:
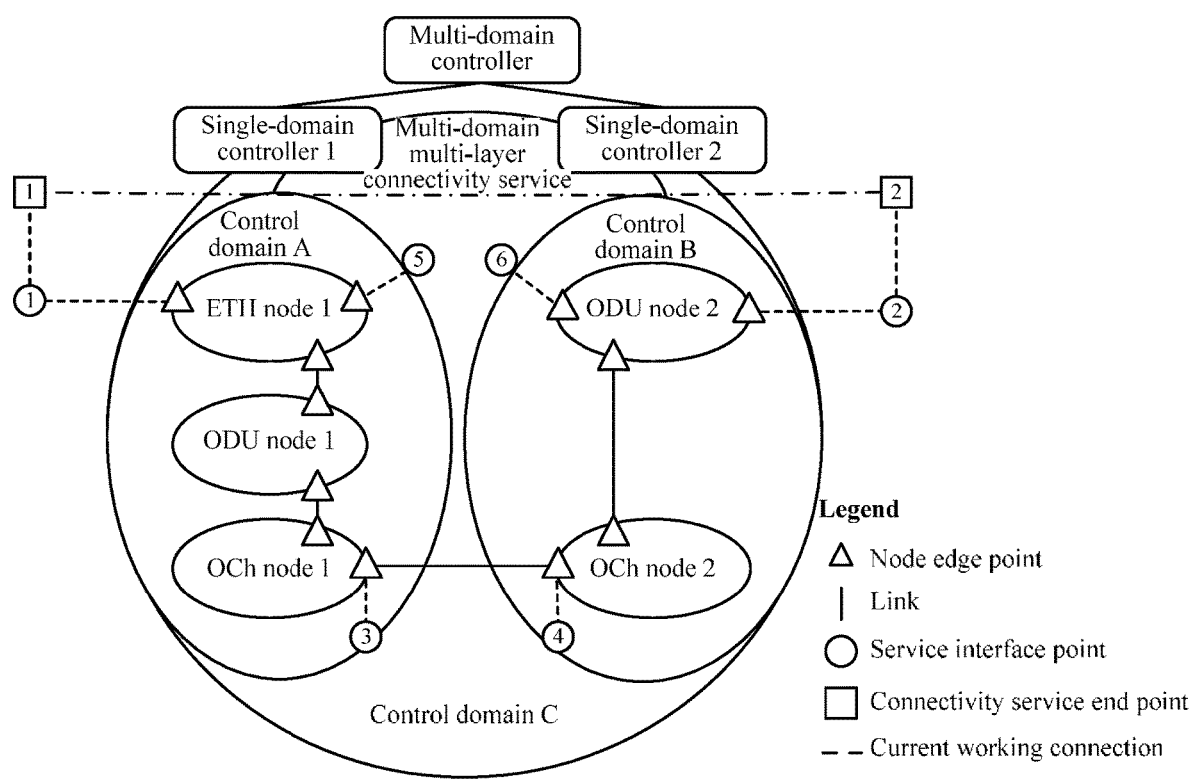
FIG. 12 is a flowchart of a method for establishing multi-domain multi-layer connectivity service according to Embodiment four of the present disclosure.

Referring to FIG. 12, a multi-domain controller controls two single-domain controllers, i.e., single-domain controller 1 and single-domain controller 2, a control domain of the multi-domain controller is control domain C, a control domain of the single-domain controller 1 is control domain A, and a control domain of the single-domain controller 2 is control domain B.

Figure 13:
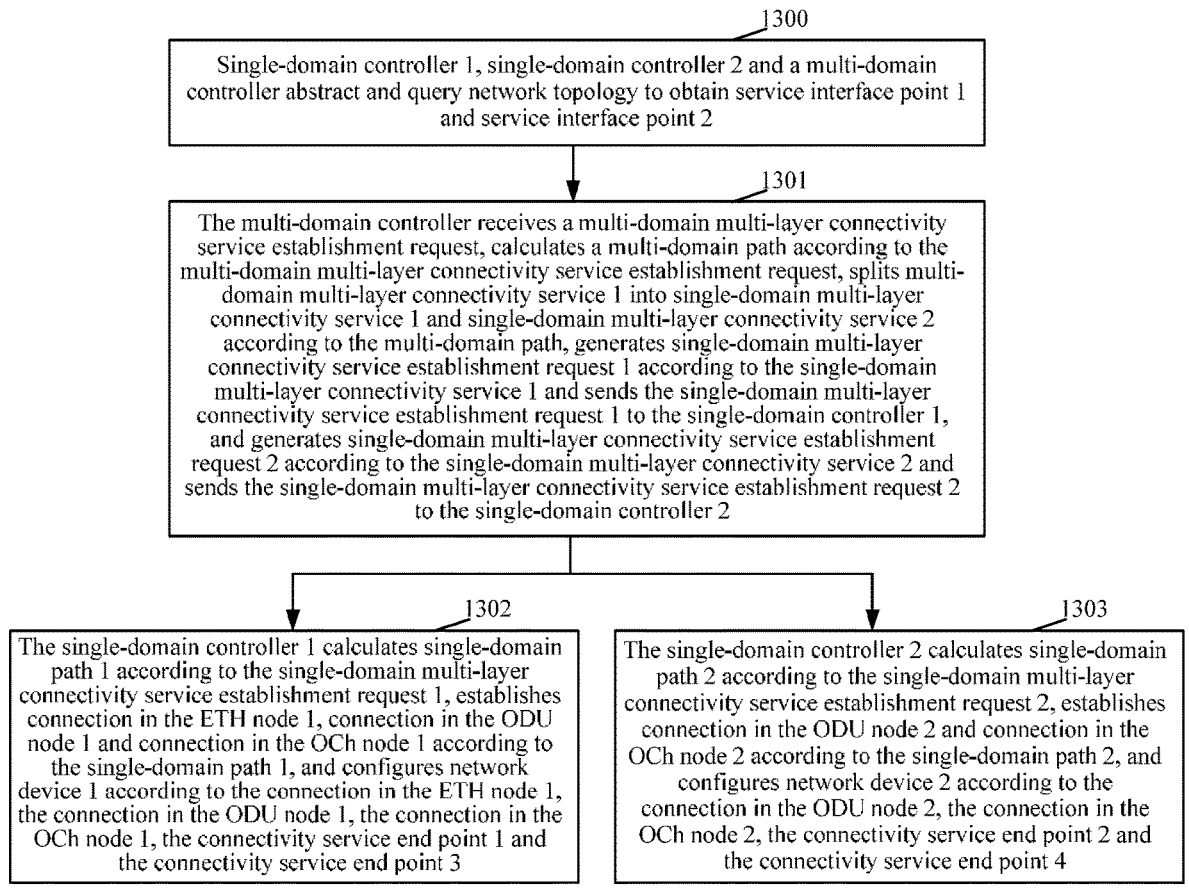
FIG. 13 is a schematic diagram illustrating establishment of multi-domain multi-layer connectivity service according to Embodiment four of the present disclosure.

Referring to FIG. 13, a method for establishing multi-domain multi-layer connectivity service provided in the embodiment includes steps described below.

In step 1300, the single-domain controller 1, the single-domain controller 2 and the multi-domain controller abstract and query the network topology to obtain service interface point 1 and service interface point 2.

In the embodiment, the service interface point 1 includes a resource pool attribute of a network layer protocol corresponding to the ETH node 1 in the control domain A, a resource pool attribute of a network layer protocol corresponding to the ODU node 1 in the control domain A, and a resource pool attribute of a network layer protocol corresponding to the OCh node 1 in the control domain A.

The service interface point 2 includes a resource pool attribute of a network layer protocol corresponding to ODU node 2 in the control domain B and a resource pool attribute of a network layer protocol corresponding to OCh node 2 in the control domain B.

In step 1301, the multi-domain controller receives a multi-domain multi-layer connectivity service establishment request, calculates a multi-domain path according to the multi-domain multi-layer connectivity service establishment request, splits multi-domain multi-layer connectivity service 1 into single-domain multi-layer connectivity service 1 and single-domain multi-layer connectivity service 2 according to the multi-domain path, generates single-domain multi-layer connectivity service establishment request 1 according to the single-domain multi-layer connectivity service 1 and sends the single-domain multi-layer connectivity service establishment request 1 to the single-domain controller 1, and generates single-domain multi-layer connectivity service establishment request 2 according to the single-domain multi-layer connectivity service 2 and sends the single-domain multi-layer connectivity service establishment request 2 to the single-domain controller 2.

In the embodiment, as shown in FIG. 12, a multi-domain multi-layer connectivity service establishment request is used for requesting establishment of multi-domain multi-layer connectivity service 1 between service interface point 1 and service interface point 2, where the multi-domain multi-layer connectivity service 1 is connectivity service of an automatic service creation layer (including an ODU layer and an OCh layer) with an ETH layer as a top layer.

The multi-domain multi-layer connectivity service establishment request includes connectivity service end point 1 and connectivity service end point 2, a one-to-one mapping relationship exists between the connectivity service end point 1 and the service interface point 1, and a one-to-one mapping relationship exists between the connectivity service end point 2 and the service interface point 2.

The connectivity service end point 1 carries: an index of the service interface point 1, configuration information 1 of the ETH network layer protocol, configuration information 1 of the ODU network layer protocol, and configuration information 1 of the OCh network layer protocol.

The connectivity service end point 2 carries: an index of the service interface point 2, configuration information 2 of the ODU network layer protocol, and configuration information 2 of the OCh network layer protocol.

Moreover, the configuration information 1 of the ODU network layer protocol is the same as the configuration information 2 of the ODU network layer protocol, and the configuration information 1 of the OCh network layer protocol is the same as the configuration information 2 of the OCh network layer protocol.

The above configuration information includes adaptation configuration information and termination function configuration information. The adaptation configuration information includes configuration information of a mapping method, e.g., a mapping method of an ODU client signal, such as GFT-F, GFP-T, and BMP.

Figure 14:
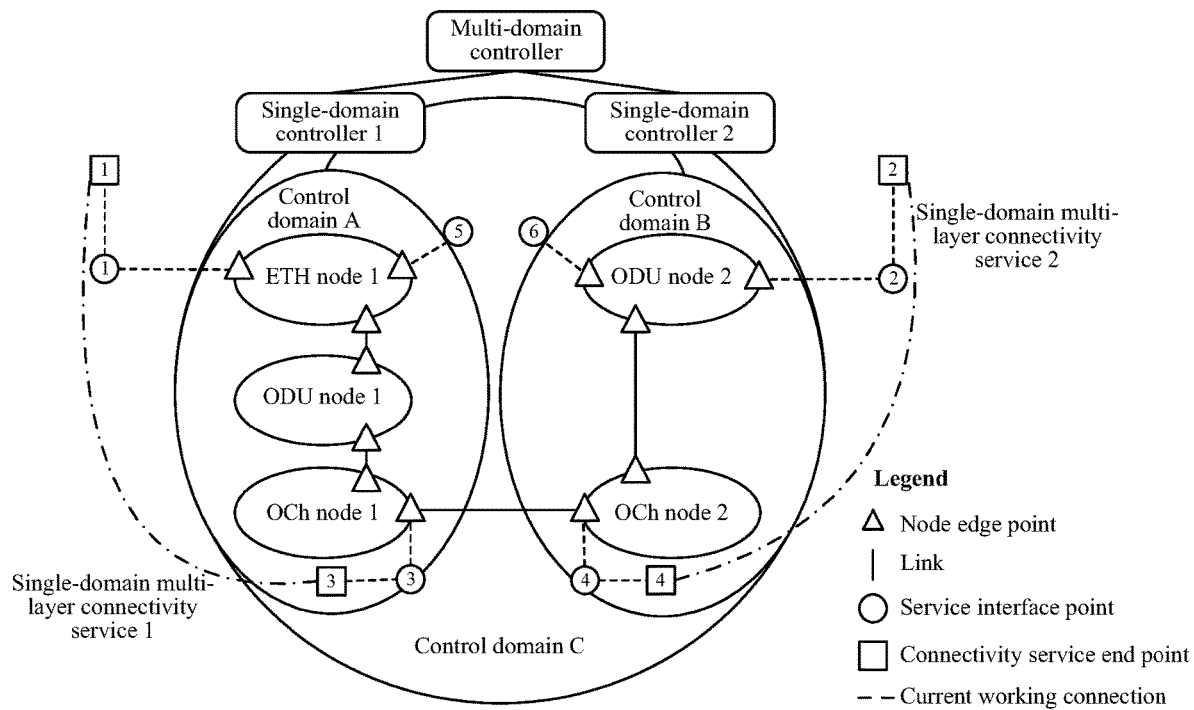
FIG. 14 is a schematic diagram illustrating establishment of single-domain multi-layer connectivity service according to Embodiment four of the present disclosure.

In the embodiment, as shown in FIG. 14, the multi-domain controller splits the multi-domain multi-layer connectivity service 1 into single-domain multi-layer connectivity service 1 and single-domain multi-layer connectivity service 2, generates single-domain multi-layer connectivity service establishment request 1 according to the single-domain multi-layer connectivity service 1 and sends the single-domain multi-layer connectivity service establishment request 1 to the single-domain controller 1 so that the single-domain controller 1 completes the establishment of the single-domain multi-layer connectivity service 1, and generates single-domain multi-layer connectivity service establishment request 2 according to the single-domain multi-layer connectivity service 2 and sends the single-domain multi-layer connectivity service establishment request 2 to the single-domain controller 2 so that the single-domain controller 2 completes the establishment of the single-domain multi-layer connectivity service 2.

In the embodiment, the single-domain multi-layer connectivity service establishment request 1 is used for requesting establishment of single-domain multi-layer connectivity service 1 in the control domain A. The single-domain multi-layer connectivity service establishment request 1 includes connectivity service end point 1 and connectivity service end point 3.

The connectivity service end point 3 carries: an index of the service interface point 3 and configuration information 3 of the OCh network layer protocol.

Moreover, the configuration information 3 of the OCh network layer protocol, the configuration information 1 of the OCh network layer protocol, and the configuration information 2 of the OCh network layer protocol are all the same.

The single-domain multi-layer connectivity service establishment request 2 is used for requesting establishment of single-domain multi-layer connectivity service 2 in the control domain B. The single-domain multi-layer connectivity service establishment request 2 includes connectivity service end point 2 and connectivity service end point 4.

The connectivity service end point 4 carries: an index of the service interface point 4 and configuration information 4 of the OCh network layer protocol.

Moreover, the configuration information 4 of the OCh network layer protocol, the configuration information 1 of the OCh network layer protocol, and the configuration information 2 of the OCh network layer protocol are all the same.

In step 1302, the single-domain controller 1 calculates single-domain path 1 according to the single-domain multi-layer connectivity service establishment request 1, establishes connection in the ETH node 1, connection in the ODU node 1 and connection in the OCh node 1 according to the single-domain path 1, and configures network device 1 according to the connection in the ETH node 1, the connection in the ODU node 1, the connection in the OCh node 1, the connectivity service end point 1 and the connectivity service end point 3.

In step 1303, the single-domain controller 2 calculates single-domain path 2 according to the single-domain multi-layer connectivity service establishment request 2, establishes connection in the ODU node 2 and connection in the OCh node 2 according to the single-domain path 2, and configures network device 2 according to the connection in the ODU node 2, the connection in the OCh node 2, the connectivity service end point 2 and the connectivity service end point 4.

Figure 15:
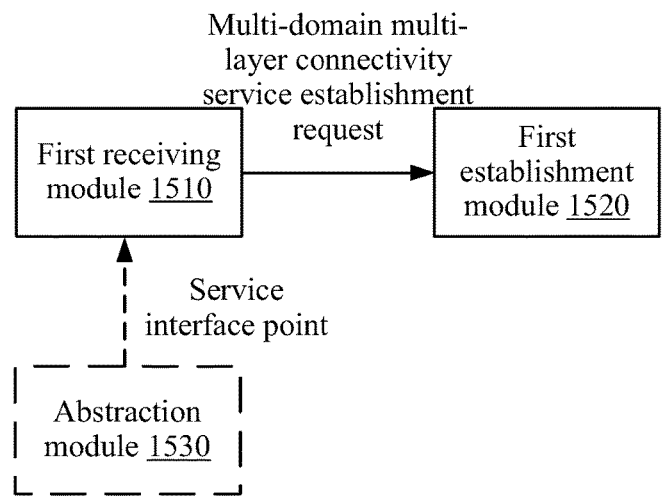
FIG. 15 is a structural diagram of an apparatus for establishing multi-domain multi-layer connectivity service according to an embodiment of the present disclosure.

Referring to FIG. 15, an apparatus for establishing multi-domain multi-layer connectivity service is provided in the present application and includes a first receiving module 1510 and a first establishment module 1520.

The first receiving module 1510 is configured to receive a multi-domain multi-layer connectivity service establishment request. The multi-domain multi-layer connectivity service establishment request is used for requesting establishment of multi-domain multi-layer connectivity service between a first service interface point of a first control domain and a second service interface point of a second control domain. The multi-domain multi-layer connectivity service establishment request carries an identifier of the first service interface point, first configuration information of two or more network layer protocols of the first service interface point, an identifier of the second service interface point, and second configuration information of two or more network layer protocols of the second service interface point. First configuration information and second configuration information of a same network layer are the same.

The first establishment module 1520 is configured to establish the multi-domain multi-layer connectivity service according to the multi-domain multi-layer connectivity service establishment request.

In an embodiment, the first establishment module 1520 is configured to: split the multi-domain multi-layer connectivity service establishment request into two or more single-domain multi-layer connectivity service establishment requests, and send the single-domain multi-layer connectivity service establishment requests to respective single-domain controllers, so that the single-domain controllers achieve establishment of single-domain multi-layer connectivity service, thereby achieving the establishment of the multi-domain multi-layer connectivity service. The single-domain multi-layer connectivity service establishment requests are used for requesting the establishment of the single-domain multi-layer connectivity service in respective control domains, and the single-domain multi-layer connectivity service establishment request carries an identifier of a third service interface point of the single-domain multi-layer connectivity service, and third configuration information of two or more network layer protocols of the third service interface point or third configuration information of a network layer protocol of a network layer where an inter-domain link of the third service interface point is located.

In an embodiment, the apparatus for establishing multi-domain multi-layer connectivity service further includes an abstraction module 1530.

The abstraction module 1530 is configured to abstract and query network topology of the controlled multi-layer network to obtain service interface points.

In an embodiment, the first establishment module 1520 is configured to split the multi-domain multi-layer connectivity service establishment request into two or more single-domain multi-layer connectivity service establishment requests in the manner described below.

A multi-domain path is calculated according to the multi-domain multi-layer connectivity service establishment request.

The multi-domain multi-layer connectivity service is split into two or more pieces of single-domain multi-layer connectivity service according to the multi-domain path.

The single-domain multi-layer connectivity service establishment request is generated according to the single-domain multi-layer connectivity service.

In an embodiment, first configuration information and second configuration information of a same network layer are the same.

In an embodiment, the multi-domain multi-layer connectivity service establishment request includes a first connectivity service end point corresponding to the first service interface point and a second connectivity service end point corresponding to the second service interface point.

The identifier of the first service interface point and the first configuration information of the two or more network layer protocols of the first service interface point are carried in the first connectivity service end point.

The identifier of the second service interface point and the second configuration information of the two or more network layer protocols of the second service interface point are carried in the second connectivity service end point.

In an embodiment, for a same network layer, first configuration information, second configuration information, and third configuration information are the same.

In an embodiment, the single-domain multi-layer connectivity service establishment request includes a third connectivity service end point corresponding to the third service interface point.

The third connectivity service end point carries the identifier of the third service interface point, and the third configuration information of the two or more network layer protocols of the third service interface point or the third configuration information of the network layer protocol of the network layer where the inter-domain link is located of the third service interface point is located.

In an embodiment, the first establishment module 1520 is configured to: calculate a multi-domain path according to the multi-domain multi-layer connectivity service establishment request; split the multi-domain multi-layer connectivity service into two or more pieces of single-domain multi-layer connectivity service according to the multi-domain path; and for each single-domain multi-layer connectivity service, establish the single-domain multi-layer connectivity service according to the first configuration information or the second configuration information.

Figure 16:
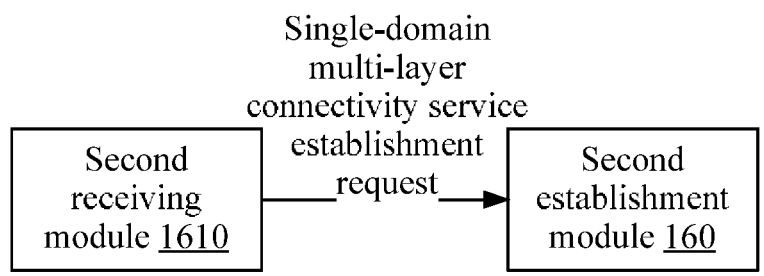
FIG. 16 is a structural diagram of another apparatus for establishing multi-domain multi-layer connectivity service according to an embodiment of the present disclosure.

Referring to FIG. 16, an apparatus for establishing multi-domain multi-layer connectivity service is provided in the present application and includes a second receiving module 1610 and a second establishment module 1620.

The second receiving module 1610 is configured to receive a single-domain multi-layer connectivity service establishment request. The single-domain multi-layer connectivity service establishment request is used for requesting establishment of single-domain multi-layer connectivity service in a corresponding control domain. The single-domain multi-layer connectivity service establishment request carries an identifier of a third service interface point of single-domain multi-layer connectivity service, and third configuration information of two or more network layer protocols of the third service interface point or third configuration information of a network layer protocol of a network layer where an inter-domain link of the third service interface point is located.

The second establishment module 1620 is configured to establish the single-domain multi-layer connectivity service according to the single-domain multi-layer connectivity service establishment request.

In an embodiment, the second establishment module 1620 is configured to: calculate a single-domain path according to the single-domain multi-layer connectivity service establishment request; establish connection in all nodes according to the single-domain path; and configure the network device corresponding to the third service interface point according to the established connection and the third configuration information in the single-domain multi-layer connectivity service establishment request, so as to achieve the establishment of the single-domain multi-layer connectivity service.

In an embodiment, third configuration information of a same network layer is the same.

In an embodiment, the single-domain multi-layer connectivity service establishment request includes a third connectivity service end point corresponding to the third service interface point.

The third connectivity service end point carries the identifier of the third service interface point, and the third configuration information of the two or more network layer protocols of the third service interface point or the third configuration information of the network layer protocol of the network layer where the inter-domain link is located of the third service interface point is located.

Figure 17:
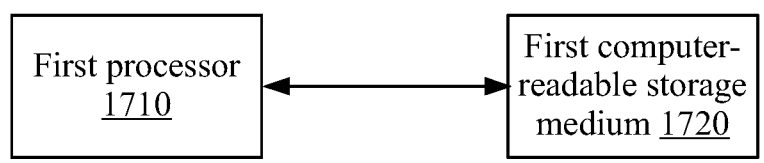
FIG. 17 is a structural diagram of a multi-domain controller according to an embodiment of the present disclosure.

Referring to FIG. 17, a multi-domain controller is provided in the present application and includes a first processor 1710 and a first computer-readable storage medium 1720, where the first computer-readable storage medium 1720 is configured to store first instructions which, when executed by the processor, cause the processor to implement any above-mentioned method for establishing multi-domain multi-layer connectivity service.

Figure 18:
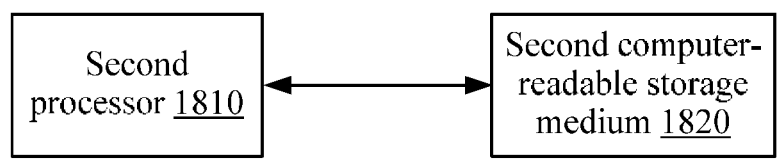
FIG. 18 is a structural diagram of a single-domain controller according to an embodiment of the present disclosure.

Referring to FIG. 18, a single-domain controller is provided in the present application and includes a second processor 1810 and a second computer-readable storage medium 1820, where the second computer-readable storage medium 1820 is configured to store second instructions which, when executed by the processor, cause the processor to implement any above-mentioned method for establishing multi-domain multi-layer connectivity service.

A computer-readable storage medium is provided in the present application and configured to store computer programs which, when executed by a processor, cause the processor to implement the steps of any above-mentioned method for establishing multi-domain multi-layer connectivity service.

Although the embodiments disclosed by the present application are as described above, the content thereof is merely embodiments for facilitating the understanding of the present application and is not intended to limit the present application. Any person skilled in the art to which the present application pertains may make any modifications and variations in the implementation forms and details without departing from the spirit and scope disclosed by the present application, but the patent protection scope of the present application is still subject to the scope defined by the appended claims.

What is claimed is:

1. A method for establishing multi-domain multi-layer connectivity service, comprising:
    receiving, by a multi-domain controller, a multi-domain multi-layer connectivity service establishment request, wherein the multi-domain multi-layer connectivity service establishment request is used for requesting establishment of multi-domain multi-layer connectivity service between a first service interface point of a first control domain and a second service interface point of a second control domain, and the multi-domain multi-layer connectivity service establishment request carries an identifier of the first service interface point, first configuration information of each of two or more network layer protocols of the first service interface point, an identifier of the second service interface point, and second configuration information of each of two or more network layer protocols of the second service interface point; and
    establishing, by the multi-domain controller, the multi-domain multi-layer connectivity service according to the multi-domain multi-layer connectivity service establishment request;
    wherein first configuration information and second configuration information of a same network layer are same.

2. The method for establishing multi-domain multi-layer connectivity service of claim 1, wherein
    the multi-domain multi-layer connectivity service establishment request comprises a first connectivity service end point corresponding to the first service interface point and a second connectivity service end point corresponding to the second service interface point;
    the identifier of the first service interface point and the first configuration information of the each of the two or more network layer protocols of the first service interface point are carried in the first connectivity service end point; and
    the identifier of the second service interface point and the second configuration information of the each of the two or more network layer protocols of the second service interface point are carried in the second connectivity service end point.

3. The method for establishing multi-domain multi-layer connectivity service of claim 1, wherein establishing, by the multi-domain controller, the multi-domain multi-layer connectivity service according to the multi-domain multi-layer connectivity service establishment request comprises:
    splitting, by the multi-domain controller, the multi-domain multi-layer connectivity service establishment request into two or more single-domain multi-layer connectivity service establishment requests, and sending the single-domain multi-layer connectivity service establishment requests to respective single-domain controllers, so that the single-domain controllers achieve establishment of single-domain multi-layer connectivity service, thereby achieving the establishment of the multi-domain multi-layer connectivity service;
    wherein the single-domain multi-layer connectivity service establishment request is used for requesting the establishment of the single-domain multi-layer connectivity service in a respective control domain, and the single-domain multi-layer connectivity service establishment request carries an identifier of a third service interface point of the single-domain multi-layer connectivity service, and third configuration information of each of two or more network layer protocols of the third service interface point or third configuration information of a network layer protocol of a network layer where an inter-domain link of the third service interface point is located.

4. The method for establishing multi-domain multi-layer connectivity service of claim 3, wherein for a same network layer, first configuration information, second configuration information, and third configuration information are same.

5. The method for establishing multi-domain multi-layer connectivity service of claim 3, wherein
the single-domain multi-layer connectivity service establishment request comprises a third connectivity service end point corresponding to the third service interface point; and
the third connectivity service end point carries the identifier of the third service interface point, and the third configuration information of the each of the two or more network layer protocols of the third service interface point or the third configuration information of the network layer protocol of the network layer where the inter-domain link of the third service interface point is located.

6. The method for establishing multi-domain multi-layer connectivity service of claim 1, wherein establishing, by the multi-domain controller, the multi-domain multi-layer connectivity service according to the multi-domain multi-layer connectivity service establishment request comprises:
calculating, by the multi-domain controller, a multi-domain path according to the multi-domain multi-layer connectivity service establishment request;
splitting, by the multi-domain controller, the multi-domain multi-layer connectivity service into two or more pieces of single-domain multi-layer connectivity service according to the multi-domain path; and
for each of the two or more pieces of single-domain multi-layer connectivity service, establishing, by the multi-domain controller, the each of the two or more pieces of single-domain multi-layer connectivity service according to the first configuration information or the second configuration information.

7. A method for establishing multi-domain multi-layer connectivity service, comprising:
receiving, by a single-domain controller, a single-domain multi-layer connectivity service establishment request, wherein the single-domain multi-layer connectivity service establishment request is used for requesting establishment of single-domain multi-layer connectivity service in a corresponding control domain, and the single-domain multi-layer connectivity service establishment request carries an identifier of a third service interface point of the single-domain multi-layer connectivity service, and third configuration information of each of two or more network layer protocols of the third service interface point or third configuration information of a network layer protocol of a network layer where an inter-domain link of the third service interface point is located; and
establishing, by the single-domain controller, the single-domain multi-layer connectivity service according to the single-domain multi-layer connectivity service establishment request;
wherein third configuration information of a same network layer is same.

8. The method for establishing multi-domain multi-layer connectivity service of claim 7, wherein the single-domain multi-layer connectivity service establishment request comprises a third connectivity service end point corresponding to the third service interface point; and
the third connectivity service end point carries the identifier of the third service interface point, and the third configuration information of the each of the two or more network layer protocols of the third service interface point or the third configuration information of the network layer protocol of the network layer where the inter-domain link of the third service interface point is located.

9. An apparatus for establishing multi-domain multi-layer connectivity service, comprising: a processor and a storage medium storing programs, wherein the programs, when executed by the processor, comprises:
a first receiving module, which is configured to receive a multi-domain multi-layer connectivity service establishment request, wherein the multi-domain multi-layer connectivity service establishment request is used for requesting establishment of multi-domain multi-layer connectivity service between a first service interface point of a first control domain and a second service interface point of a second control domain, and the multi-domain multi-layer connectivity service establishment request carries an identifier of the first service interface point, first configuration information of each of two or more network layer protocols of the first service interface point, an identifier of the second service interface point, and second configuration information of each of two or more network layer protocols of the second service interface point; and
a first establishment module, which is configured to establish the multi-domain multi-layer connectivity service according to the multi-domain multi-layer connectivity service establishment request;
wherein first configuration information and second configuration information of a same network layer are same.

10. The apparatus for establishing multi-domain multi-layer connectivity service of claim 9, wherein
the multi-domain multi-layer connectivity service establishment request comprises a first connectivity service end point corresponding to the first service interface point and a second connectivity service end point corresponding to the second service interface point;
the identifier of the first service interface point and the first configuration information of the each of the two or more network layer protocols of the first service interface point are carried in the first connectivity service end point; and
the identifier of the second service interface point and the second configuration information of the each of the two or more network layer protocols of the second service interface point are carried in the second connectivity service end point.

11. The apparatus for establishing multi-domain multi-layer connectivity service of claim 9, wherein the first establishment module is configured to:
split the multi-domain multi-layer connectivity service establishment request into two or more single-domain multi-layer connectivity service establishment requests, and send the single-domain multi-layer connectivity service establishment requests to respective single-domain controllers, so that the single-domain controllers achieve establishment of single-domain multi-layer connectivity service, thereby achieving the establishment of the multi-domain multi-layer connectivity service;

wherein the single-domain multi-layer connectivity service establishment request is used for requesting the establishment of the single-domain multi-layer connectivity service in a respective control domain, and the single-domain multi-layer connectivity service establishment request carries an identifier of a third service interface point of the single-domain multi-layer connectivity service and third configuration information of each of two or more network layer protocols of the third service interface point or third configuration information of a network layer protocol of a network layer where an inter-domain link of the third service interface point is located.

12. The apparatus for establishing multi-domain multi-layer connectivity service of claim 11, wherein for a same network layer, first configuration information, second configuration information, and third configuration information are same.

13. The apparatus for establishing multi-domain multi-layer connectivity service of claim 11, wherein the single-domain multi-layer connectivity service establishment request comprises a third connectivity service end point corresponding to the third service interface point; and the third connectivity service end point carries the identifier of the third service interface point, and the third configuration information of the each of the two or more network layer protocols of the third service interface point or the third configuration information of the network layer protocol of the network layer where the inter-domain link of the third service interface point is located.

14. The apparatus for establishing multi-domain multi-layer connectivity service of claim 9, wherein the first establishment module is configured to:

calculate a multi-domain path according to the multi-domain multi-layer connectivity service establishment request;

split the multi-domain multi-layer connectivity service into two or more pieces of single-domain multi-layer connectivity service according to the multi-domain path; and for each of the two or more pieces of single-domain multi-layer connectivity service, establish the each of the two or more pieces of single-domain multi-layer connectivity service according to the first configuration information or the second configuration information.

15. An apparatus for establishing multi-domain multi-layer connectivity service, applied for the method of claim 7, comprising: a processor and a storage medium storing programs, wherein the programs, when executed by the processor, comprises:

a second receiving module, which is configured to receive a single-domain multi-layer connectivity service establishment request, wherein the single-domain multi-layer connectivity service establishment request is used for requesting establishment of single-domain multi-layer connectivity service in a corresponding control domain, and the single-domain multi-layer connectivity service establishment request carries an identifier of a third service interface point of the single-domain multi-layer connectivity service, and third configuration information of each of two or more network layer protocols of the third service interface point or third configuration information of a network layer protocol of a network layer where an inter-domain link of the third service interface point is located; and a second establishment module, which is configured to establish the single-domain multi-layer connectivity service according to the single-domain multi-layer connectivity service establishment request;

wherein third configuration information of a same network layer is same.

16. The apparatus for establishing multi-domain multi-layer connectivity service of claim 15, wherein the single-domain multi-layer connectivity service establishment request comprises a third connectivity service end point corresponding to the third service interface point; and the third connectivity service end point carries the identifier of the third service interface point, and the third configuration information of the each of the two or more network layer protocols of the third service interface point or the third configuration information of the network layer protocol of the network layer where the inter-domain link of the third service interface point is located.

* * * * *